US009282377B2

(12) United States Patent  
Bruner

(10) Patent No.: US 9,282,377 B2
(45) Date of Patent: *Mar. 8, 2016

(54) APPARATUSES, METHODS AND SYSTEMS TO PROVIDE TRANSLATIONS OF INFORMATION INTO SIGN LANGUAGE OR OTHER FORMATS

(71) Applicant: iCommunicator LLC, Brooklyn, NY (US)

(72) Inventor: Steven Bruner, Brooklyn, NY (US)

(73) Assignee: ICOMMUNICATOR LLC, Brooklyn, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/058,975

(22) Filed: Oct. 21, 2013

(65) Prior Publication Data

US 2014/0046661 A1    Feb. 13, 2014

Related U.S. Application Data

(63) Continuation-in-part of application No. 11/756,298, filed on May 31, 2007, now Pat. No. 8,566,075.

(51) Int. Cl.
*G06F 17/28* (2006.01)
*H04N 21/488* (2011.01)
(Continued)

(52) U.S. Cl.
CPC ............ *H04N 21/4884* (2013.01); *G06F 17/28* (2013.01); *G06F 17/2881* (2013.01);
(Continued)

(58) Field of Classification Search
CPC ... G09B 21/009; G06F 17/2872; G06F 3/017; G10L 21/06
See application file for complete search history.

(56) References Cited

U.S. PATENT DOCUMENTS 5,481,454 A    1/1996 Inoue et al.
5,544,050 A    8/1996 Abe et al.
(Continued)

FOREIGN PATENT DOCUMENTS

WO    2015/061248    4/2015

OTHER PUBLICATIONS

Veale, et al., "The Challenges of Cross-Modal Translation: English-to-Sign-Language Translation in the Zardoz System", Machine Translation 13: 81-106, Kluwer Academic Publishers, 1998.
(Continued)

*Primary Examiner* — Jialong He
(74) *Attorney, Agent, or Firm* — Fitch, Even, Tabin & Flannery LLP

(57) ABSTRACT

Some embodiments provide methods of providing a translation of information to a translated format comprising: receiving information in a first format; identifying the first format, where in the first format is one of a plurality of different formats configured to be received; processing the information in accordance with the first format and extracting one or more speech elements from the information; identifying, through at least one processor configured to translate the received information, one or more sign language identifiers corresponding the one or more extracted speech elements, wherein at least one of the one or more sign language identifiers directly corresponds to a synonym of at least one of the one or more speech elements; and causing one or more sign language clips corresponding to at least one of the one or more sign language identifiers to be reproduced on a display of a displaying device.

16 Claims, 11 Drawing Sheets

(51) Int. Cl.

| | | |
|---|---|---|
| *G10L 21/10* | (2013.01) | |
| *H04N 21/235* | (2011.01) | |
| *H04N 21/2343* | (2011.01) | |
| *H04N 21/658* | (2011.01) | |
| *G09B 21/00* | (2006.01) | |
| *G10L 21/06* | (2013.01) | |
| *G10L 15/26* | (2006.01) | |

(52) U.S. Cl.
CPC ............ *G09B21/009* (2013.01); *G10L 21/10* (2013.01); *H04N 21/235* (2013.01); *H04N 21/234336* (2013.01); *H04N 21/6582* (2013.01); *G10L 15/26* (2013.01); *G10L 21/06* (2013.01)

(56) References Cited

U.S. PATENT DOCUMENTS

| | | | |
|---|---|---|---|
| 5,659,764 A | | 8/1997 | Sakiyama et al. |
| 5,734,923 A | * | 3/1998 | Sagawa et al. ............... 715/204 |
| 5,890,120 A | * | 3/1999 | Haskell et al. ............... 704/271 |
| 5,953,693 A | * | 9/1999 | Sakiyama et al. ............... 704/3 |
| 5,990,878 A | | 11/1999 | Ikeda et al. |
| 6,116,907 A | | 9/2000 | Baker et al. |
| 6,181,778 B1 | | 1/2001 | Ohki et al. |
| 6,215,890 B1 | * | 4/2001 | Matsuo et al. ............... 382/103 |
| 6,250,928 B1 | | 6/2001 | Poggio et al. |
| 6,377,925 B1 | * | 4/2002 | Greene et al. ............... 704/271 |
| 6,460,056 B1 | * | 10/2002 | Horii ............................ 715/203 |
| 6,549,887 B1 | | 4/2003 | Ando et al. |
| 7,277,858 B1 | | 10/2007 | Weaver et al. |
| 8,566,075 B1 | | 10/2013 | Bruner |
| 2002/0032702 A1 | | 3/2002 | Horii |
| 2002/0140718 A1 | | 10/2002 | Yan et al. |
| 2003/0027489 A1 | | 2/2003 | Kay |
| 2004/0012643 A1 | | 1/2004 | August et al. |
| 2004/0034522 A1 | | 2/2004 | Liebermann et al. |
| 2004/0143673 A1 | | 7/2004 | Kristjansson |
| 2005/0033578 A1 | | 2/2005 | Zuckerman |
| 2006/0134585 A1 | | 6/2006 | Adamo-Villani et al. |
| 2006/0174315 A1 | * | 8/2006 | Kim et al. ............... 725/136 |
| 2008/0195373 A1 | * | 8/2008 | Ander et al. ............... 704/2 |
| 2009/0012788 A1 | * | 1/2009 | Gilbert et al. ............... 704/235 |
| 2013/0204605 A1 | | 8/2013 | Illgner-Fehns et al. |

OTHER PUBLICATIONS

Murph, Darren, "Detection Algorithms to Enable Sign Language On-The-Go", Feb. 14, 2007, Internet article, www.engadget.com.
"Sign Language Animations", Internet article, pp. 1-5, www.signingbooks.org, Nov. 12, 2007.
"RNID: For Deaf and Hard of Hearing People", pp. 1-2, Internet article, www.rnid.org.uk, Nov. 12, 2007.
"RNID: For Deaf and Hard of Hearing People", pp. 1-4, Internet article, www.rnid.org.uk, Nov. 12, 2007.
PCT; App. No. PCT/US2014/061457; International Search Report and Written Opinion mailed Feb. 5, 2015; 9 pages.
U.S. Appl. No. 11/756,298; Office Action mailed Aug. 18, 2010; 14 pages.
U.S. Appl. No. 11/756,298; Final Office Action mailed Apr. 21, 2011; 18 pages.
U.S. Appl. No. 11/756,298; Interview Summary mailed Jul. 21, 2011; 3 pages.
U.S. Appl. No. 11/756,298; Advisory Action mailed Jul. 21, 2011; 3 pages.
U.S. Appl. No. 11/756,298; Notice of Allowance mailed Jun. 21, 2013; 12 pages.
Fourie, Jaco; The Design of a Generic Signing Avatar Animation System; Univ. Of Stellenbosch; Nov. 2006; 84 pages.

* cited by examiner

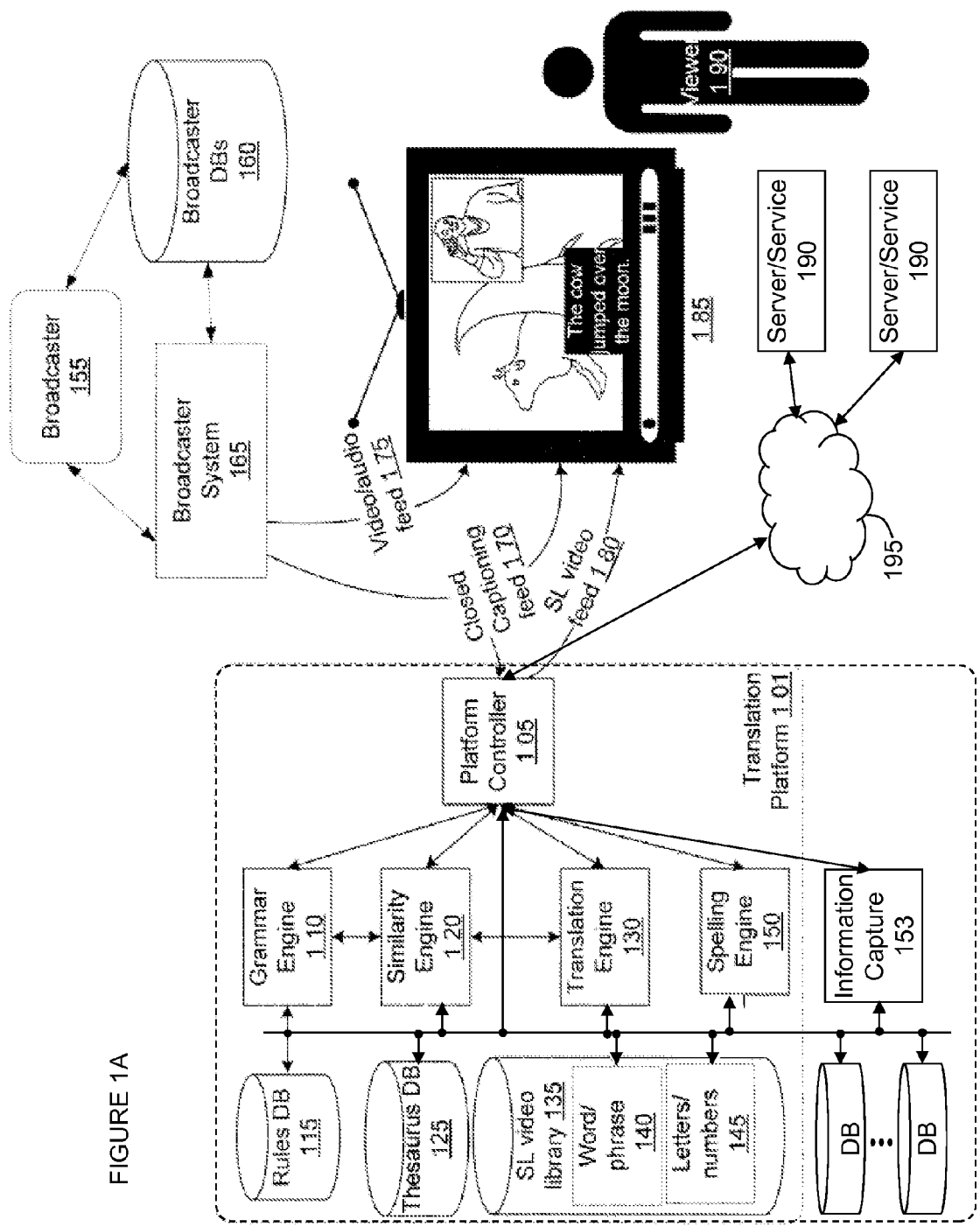

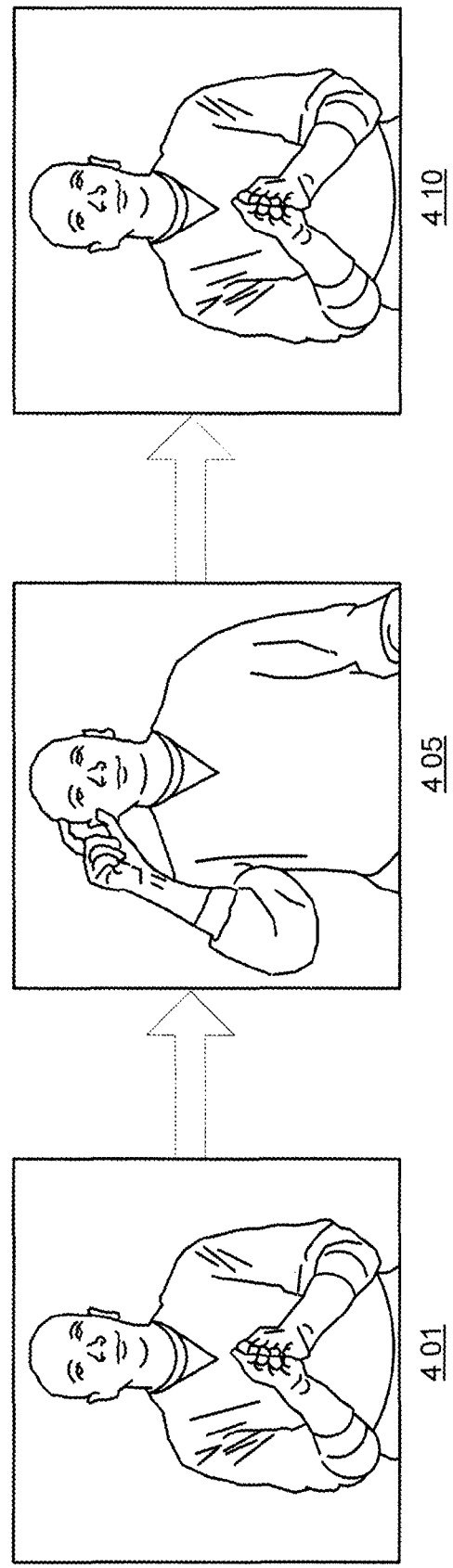

US 9,282,377 B2

APPARATUSES, METHODS AND SYSTEMS TO PROVIDE TRANSLATIONS OF INFORMATION INTO SIGN LANGUAGE OR OTHER FORMATS

This application is a continuation-in-part of U.S. application Ser. No. 11/756,298, filed May 31, 2007, for Steve Bruner, entitled APPARATUSES, METHODS AND SYSTEMS FOR A TEXT-TO-SIGN LANGUAGE TRANSLATION PLATFORM, which is incorporated in its entirety herein by reference.

FIELD

The present invention is directed generally to apparatuses, methods, and systems of accessibility, and more particularly, to apparatuses, methods and systems that provide information in sign language ("SL").

BACKGROUND

Closed Captioning feeds accompanying video and audio broadcasts help hearing impaired individuals understand and enjoy content that might otherwise be inaccessible to them. Currently, most television broadcasts, both live and pre-recorded, are transmitted with accompanying Closed Captioning or Subtitles. Advances in data storage and transmission technology have also come about that allow quick access to properly organized data of a variety of different file formats.

SUMMARY

Several embodiments of the invention advantageously address the needs above as well as other needs through methods of providing a translation of information to a translated format comprising: receiving information in a first format; identifying the first format, where in the first format is one of a plurality of different formats configured to be received; processing the information in accordance with the first format and extracting one or more speech elements from the information; identifying, through at least one processor configured to translate the received information, one or more sign language (SL) identifiers corresponding the one or more extracted speech elements, wherein at least one of the one or more sign language identifiers directly corresponds to a synonym of at least one of the one or more speech elements; and causing one or more sign language clips corresponding to at least one of the one or more sign language identifiers to be reproduced on a display of a displaying device.

Some embodiments provide systems for use in translating information, comprising: a non-transitory processor readable memory; one or more processors disposed in communication with the processor readable memory, wherein the one or more processors are configured to implement a plurality of processing instructions stored in the processor readable memory, wherein the instructions when implemented cause the one or more processors to: receive information in a first format; identify the first format, where in the first format is one of a plurality of different formats configured to be received; process the information in accordance with the first format and extract one or more speech elements from the information; identify one or more sign language (SL) identifiers corresponding the one or more extracted speech elements, wherein at least one of the one or more sign language identifiers directly corresponds to a synonym of at least one of the one or more speech elements; and cause one or more sign language clips corresponding to at least one of the one or more sign language identifiers to be reproduced on a display of a displaying device.

BRIEF DESCRIPTION OF THE DRAWINGS

The above and other aspects, features and advantages of several embodiments of the present invention will be more apparent from the following more particular description thereof, presented in conjunction with the following drawings.

FIG. 1A provides an overview of translation platform components and entities that may interact with the translation platform at various points during system utilization in one embodiment;

FIG. 4 shows a technique to reduce discontinuity between video clips in one embodiment;

Figure 1B:
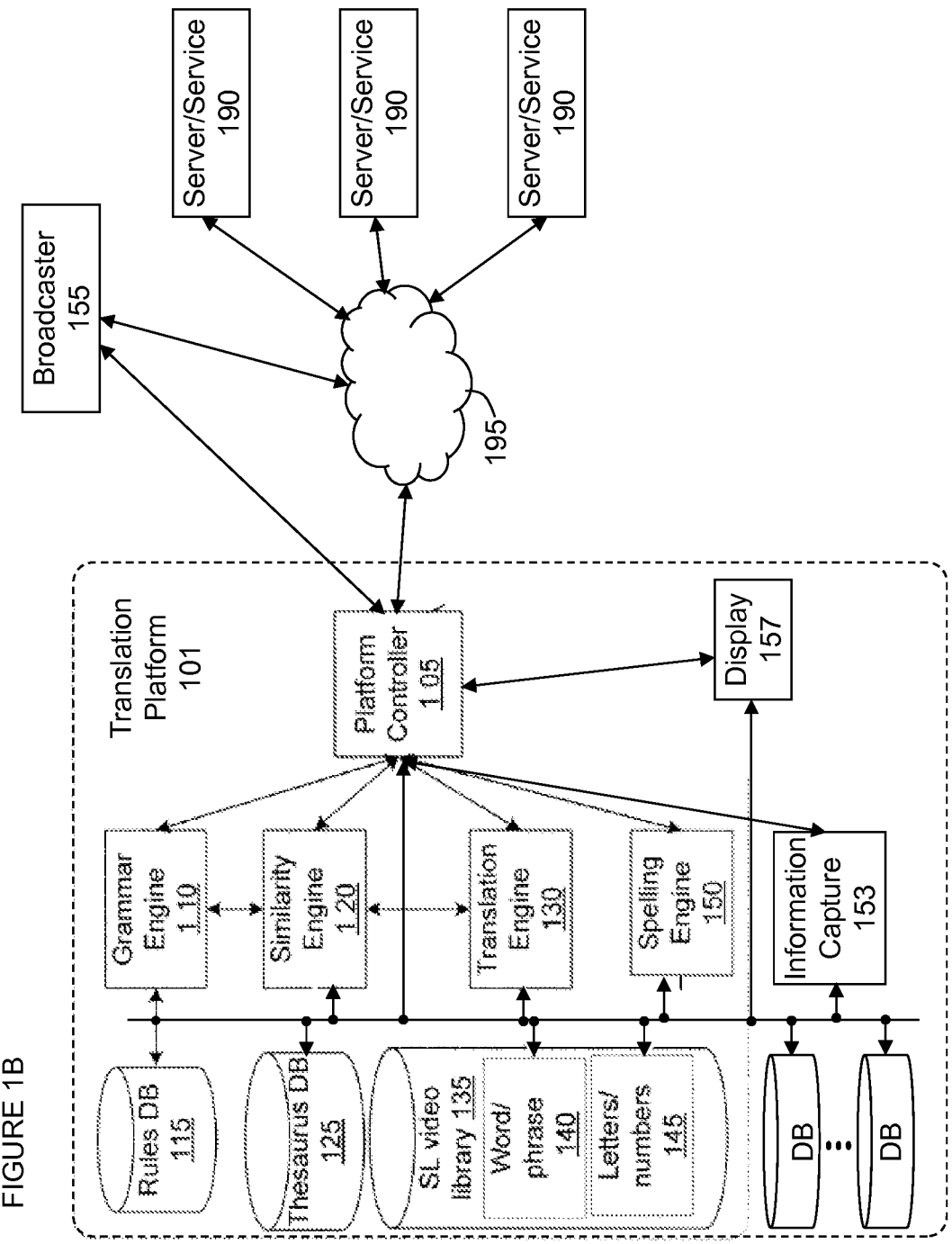
FIG. 1B shows a simplified block diagram illustrating an overview of exemplary translation platform components and entities that may interact with the translation platform at various points during system utilization, in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Information/Language Translation Platform

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The translation of information from one format to another format can be very beneficial to many users and/or audiences. For example, though Closed Captioning is beneficial for many individuals, there are those for whom an alternative form of communication may be preferable or more beneficial. For example, people who are born deaf or who lose their hearing within the first three years of life often have difficulty with spoken languages and may even come to view those languages as secondary to sign language, which can be perceived as a more natural, primary language choice. These people may have trouble reading captions and, consequently, would benefit from alternative forms of accessibility translations.

This disclosure details exemplary embodiments of implementations of apparatuses, methods, and systems for use in translating information and translation platforms. Some embodiments provide translation platforms configured to process various types of information and/or identify speech and/or textual elements as inputs to yield sequences of sign language identifiers, video clips, avatar instructions or the like corresponding to the information content of those inputs. In one embodiment, the Translation Platform allows for rapid conversion of Closed Captioning text feeds to a sign language video stream that may be displayed, for example, in a picture-in-picture box on a television or other display medium alongside the corresponding broadcast, thereby providing hearing impaired individuals with an alternative and possibly more effective accessibility option.

In one embodiment, a method is disclosed for translating speech elements derived from a Closed Captioning feed to sign language video clips, comprising receiving an input speech element, querying a video database for the speech element, selecting from the video database at least one target video clip based on the speech element wherein the at least one target video clip exhibits continuity promoting images in the opening and closing frames, and outputting the at least one target video clip to a display device.

In another embodiment, a method is disclosed for translating speech elements derived from a Closed Captioning feed to sign language video clips, comprising receiving an input speech element, selecting from a video database at least one target video clip directly corresponding to the speech element for speech elements that exist in the video database, querying a thesaurus for the speech element and selecting from a video database at least one target video clip directly corresponding to at least one synonym of the speech element for speech elements that do not exist in the video database but do exist in the thesaurus database, querying a thesaurus database for the speech element and selecting from video database at least one target video clip directly corresponding to at least one constituent letter of the speech element for speech elements that do not exist in either the video database or the thesaurus database, and outputting the video clip for display.

The present disclosure describes non-limiting exemplary embodiments of apparatuses, methods, and systems for use in providing translations and information and language translation platforms (hereafter "translation platform").

The translation platform may be configured to receive and process electronic information and/or data (e.g., information pertaining to spoken information, textual information, wirelessly communicated information, image and/or photographic information, and/or other such information, and typically regardless of the language), and produce corresponding translated information. For example, some embodiments are configured to receive information and translate that information into a corresponding sign-language translation, which may be manifested, for example, in one or more video clips, displayed through animation and/or presented by one or more avatars, and/or other such manifestations or combinations of such manifestations. In one embodiment, the translation platform employs or interacts with three basic actors: (i) a source or "broadcaster" of information capable of supplying content data that can be captured and/or inputted to the translation platform; (ii) a "display" configured to display, playback and/or generate video output, the avatar or the like as instructed by the translation platform; and (iii) a "display control processor" configured to receive and process the broadcaster information or input, and provide instructions, codes and/or supply video output to the display.

While some embodiments of the translation platform may be described herein primarily in the context of converting Closed Captioning data-streams to sign language video clips in a picture-in-picture style display on a television screen, it is to be understood that this is merely for illustrative purposes, and that the translation platform may in fact be configured for a wide variety of different applications and implementations, as well as providing a translation from one of a wide variety of formats and to one or more of a wide variety of translated formats. For example, the translation platform may be configured as a set-top box that receives an input from a cable box. In another implementation, the translation platform may be incorporated into the cable box. In yet other embodiments, the translation platform may be implemented as an application and/or software on a smart phone, tablet, computer or the like that is configured to receive and/or capture input information, communicate the input information to a remote translation source (e.g., a translation server(s) and/or service) that returns translated information, and to present the translated information to a user through the smart phone, tablet, etc. In still other embodiments, a smart phone, computer, tablet or other such device performs some or all of the translation.

In yet another implementation, some or all of the translation platform may be incorporated into the video display device. Furthermore, the generic term "sign language" should be understood to encompass all forms of sign language, including but not limited to American Sign Language (ASL), British Sign Language (BSL), French Sign Language (FSL), Signed English, Pidgin Signed English, Manually Coded English, and/or the like.

Structural Overview

FIG. 1A provides an overview of exemplary translation platform components and entities that may interact with the translation platform 101 at various points during system utilization in accordance with one embodiment. The translation platform 101 may contain a number of functional modules and data libraries. A platform controller 105 may orchestrate the reception and distribution of data to and from the translation platform, as well as between various other translation platform modules. A grammar engine 110 may communicate with a rules database 115, containing a collection of language grammar rules, to process contextual aspects of audio, textual and/or written speech inputs. A similarity engine 120 may communicate with a thesaurus database 125, containing lists of speech elements with associated synonyms, to find synonyms for input speech elements. A translation engine 130 may communicate with a sign language (SL) video library 135, containing video clips of words/phrases 140 and letters/numbers 145, and/or the like in sign language format, to produce sign language video clips corresponding to speech element inputs. Additionally or alternatively, the translation engine 130 may identify and/or generate translation identifiers of translation elements (e.g., sign language elements, videos, code, etc.). For example, the translation engine may select or generate SL instructions, codes, identifiers or the like that is used to control the display of an avatar in presenting the translated sign language. Still further, the translation engine may communicate with one or more other databases and/or libraries, such as but not limited to dictionary databases, phrase databases, different language databases, and/or other such databases and/or libraries to provide relevant translations. Additionally, in some embodiments, the system may further process input information to try and correct errors, such as misspellings and the like.

Other elements of speech for which sign language signs exist may also be included in the SL video library and/or databases, such as punctuation, grammatical and/or mathematical symbols, and/or the like. Video clips contained in the SL video library may be comprised of recordings of a real person, cartoon figures, computer-generated avatars, and/or the like performing sign language. A spelling engine 150 may process written speech inputs to discern constituent letters and communicate with the SL video library 135 to extract the corresponding sign language video clips.

In some embodiments, the translation platform 101 further comprises or couples with an information capture system 153. The information capture system is configured to capture information that can be translated. For example, the information capture system 153 may comprise, but is not limited to, one or more audio capture and/or recording systems, cameras or other such image capturing systems, video cameras, bar code reader systems, RFID tag reader systems, wired and/or wireless communications systems (e.g., cellular communication system, WiFi communication system, Blu-tooth communication system, etc.), email systems, internet browsing systems, and/or other such relevant systems that can capture, receive, detect and/or extract relevant information to be translated.

The translation platform 101 may be in communicative contact with a broadcaster 155, with associated broadcaster database 160 and broadcaster system 165 and configured to receive a textual speech input, such as a Closed Captioning feed 170. The broadcaster may also supply the Closed Captioning feed 170 and associated video/audio feed 175 directly to a display device 185 for a viewer 190 to see. The translation platform 101 is also communicatively coupled to the display device 185 to supply a SL video feed 180.

Additionally, in some embodiments, the translation platform 101 further includes and/or is in communication with one or more translation services and/or servers 190. For example, the translation platform may be in communication over the Internet 195 with the one or more translation servers 190. The translation platform can be configured to communicate some or all of the information received from a broadcaster and/or locally captured or detected to one or more of the servers that are configured to perform some or all of the translation. The translation servers 190 can return the translated SL (e.g., video clips), code and/or instructions (e.g., programming to control and/or display an avatar), identifiers of translated words, phrases, numbers, etc. (e.g., video clip identifiers, predefined avatar programming or code, etc.), and/or other such information. The translation platform 101 can then present the translated information and/or acquire the translation and present the translation either locally (e.g., on a display or through an audio system of the translation platform) and/or in a remote device (e.g., a television, computer, tablet or the like) in communication with the translation platform.

In one embodiment, the platform controller 105 is housed separately from other modules within the translation platform, while in another embodiment, the other modules are housed within the platform controller module.

FIG. 1B shows a simplified block diagram illustrating an overview of exemplary translation platform components and entities that may interact with the translation platform 101 at various points during system utilization, in accordance with some embodiments. The translation platform 101 can be incorporated into a device utilized by a user, such as a smart phone, tablet, laptop, computer, television, set-top-box or other such device. Further, in some embodiments, the translation platform communicates with one or more remote servers and/or services 190 that can be configured to perform some or all of the translation. Still further, in some embodiments, the translation platform 101 and/or the device within which the translation platform is implemented can include the information capture system 153 that is configured to capture information to be translated. Although shown as cooperated within a single device, the platform in some embodiments may be distributed over multiple devices that may be directly coupled and/or coupled over a network (e.g., LAN, WAN, Internet, etc.).

Figure 2:
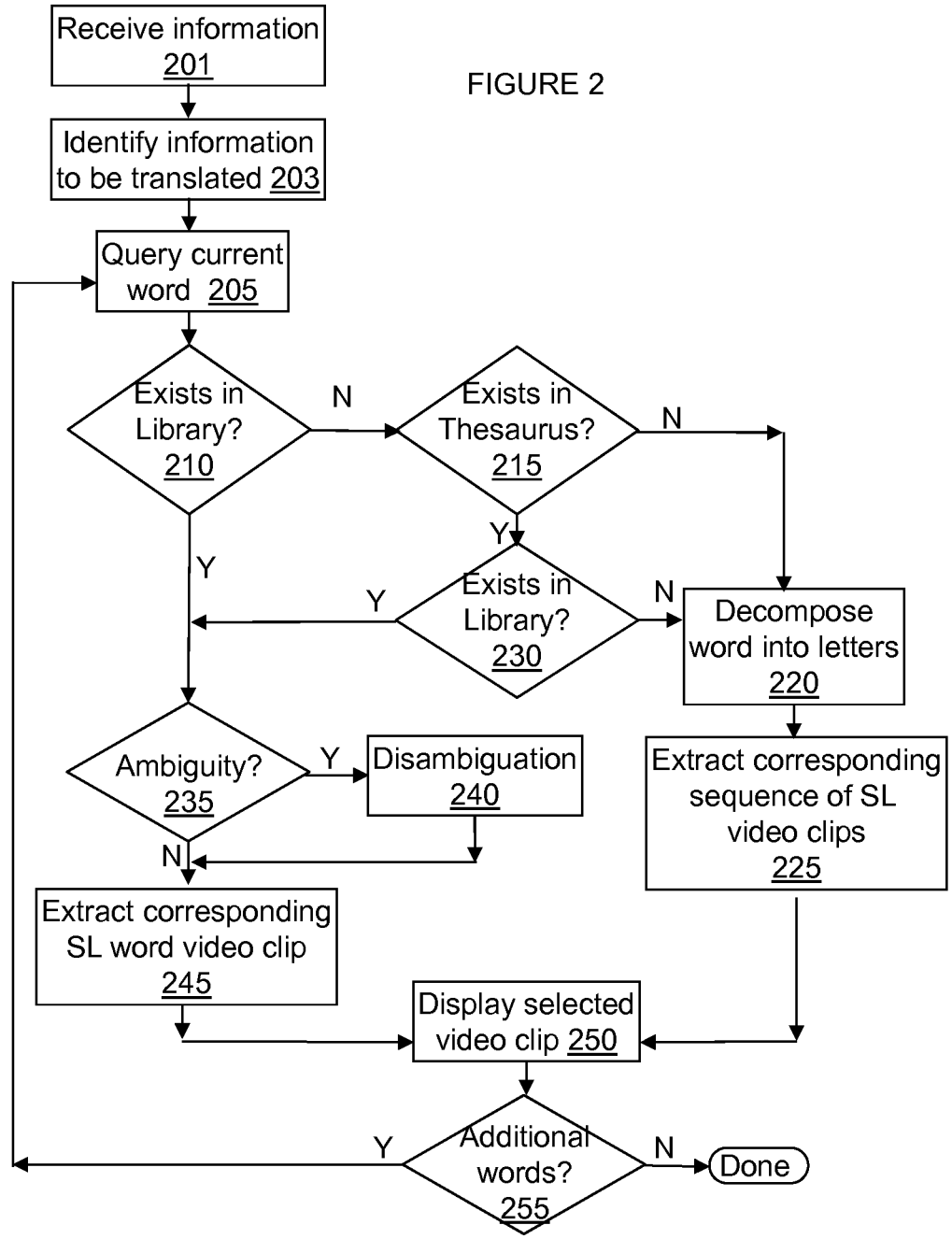
FIG. 2 shows logic flow for the translation platform in one embodiment.

Process Flow Overview FIG. 2 shows logic flow for the translation platform in one embodiment.

The translation platform receives and/or captures information (e.g., a Closed Captioning ("CC") feed) at 201. The translation platform may be configured to receive and process a variety of information in one of multiple different format (e.g. audio, video, images, textual elements as well as other forms of text-based speech such as subtitles, RSS feeds and other web feeds, news feeds, news tickers, stock tickers, and generally any text element that may exist in or be converted to digital format) and provide a translation to one or more translated formats (e.g., sign language, text, audio, video, and other such formats or combinations of such formats). Further, in some embodiments, the translation platform can capture or receive information in formats such as, but not limited to, audio content, video content, image content, photographs, and/or other such information. At optional step 203, received information is processed to identify information and/or speech elements to be translated. For example, voice recognition software can be applied to recorded audio to convert audio information into textual information. As another example, an image can be scanned and/or optical character recognition (OCR) can be performed to identify words, numbers, phrases and/or other such relevant information. Similarly, one or more frames and/or portions of a video can be scanned, OCR performed, image recognition preformed, tracking movement over multiple frames, or otherwise processed to identify information. For example, some embodiments provide translation from sign language to another type of information (e.g., to audio, text, etc.) by capturing video of a person signing, and identifying the various signs (e.g., by tracking movements of the user over multiple frames, and recognizing predefined movements, and correlating those movements to words, phrases, letters, or the like of sign language, and translating the sign language to a requested translated format). Additionally or alternatively, closed captioning from a video can be identified and extracted. Other processing can be performed depending on the input information received.

At 205, the translation platform conducts a query based on the current word, for example the first word in reading order of the Closed Captioning feed that has not yet been processed by the platform. More specifically, the system's current word query, checks the SL video library to see if a corresponding video element exists therein 210. If not, the current word query checks a thesaurus database to determine if a similar video element can be matched therein 215. If the thesaurus check does not result in a match, then the current word may be decomposed into constituent letters and/or numbers 220 and the SL video clips corresponding to these letters and/or numbers may be extracted and aggregated in a video clip from SL video database at 225.

Alternatively, if the current word thesaurus database check 215 returns a match, then each possible corresponding synonym may be checked against the SL video library until a viable current word alternate is found in the SL video library 230. If none of the current word's synonyms exist in the SL video library, the platform proceeds to steps over to constituent letter processing 220. Otherwise, if the original current word or its synonyms exist in the SL video library, then the translation platform proceeds to 235, where a determination is made as to whether any additional ambiguity exists about which SL video clip to extract from the SL video library. Ambiguity may arise, for example, for homographs, that is words that have the same spelling but different meanings (for example, "bark" may refer to the skin of a tree or to the sound that a dog makes). If ambiguity exists, then a disambiguation procedure is undertaken at 240, which will be described in greater detail below, to winnow multiple possible results to a single SL video clip. At 245, the selected SL video clip corresponding to the current word or one of its synonyms is extracted from the SL video library. At 250, selected video clips are output to the display, and the platform checks at 255 whether there are further words to process. In some implementations, processing speed is prioritized over precision. Accordingly, in such implementations, the translation platform may sacrifice precision by omitting the ambiguity analysis.

Video Output

Figure 3A:
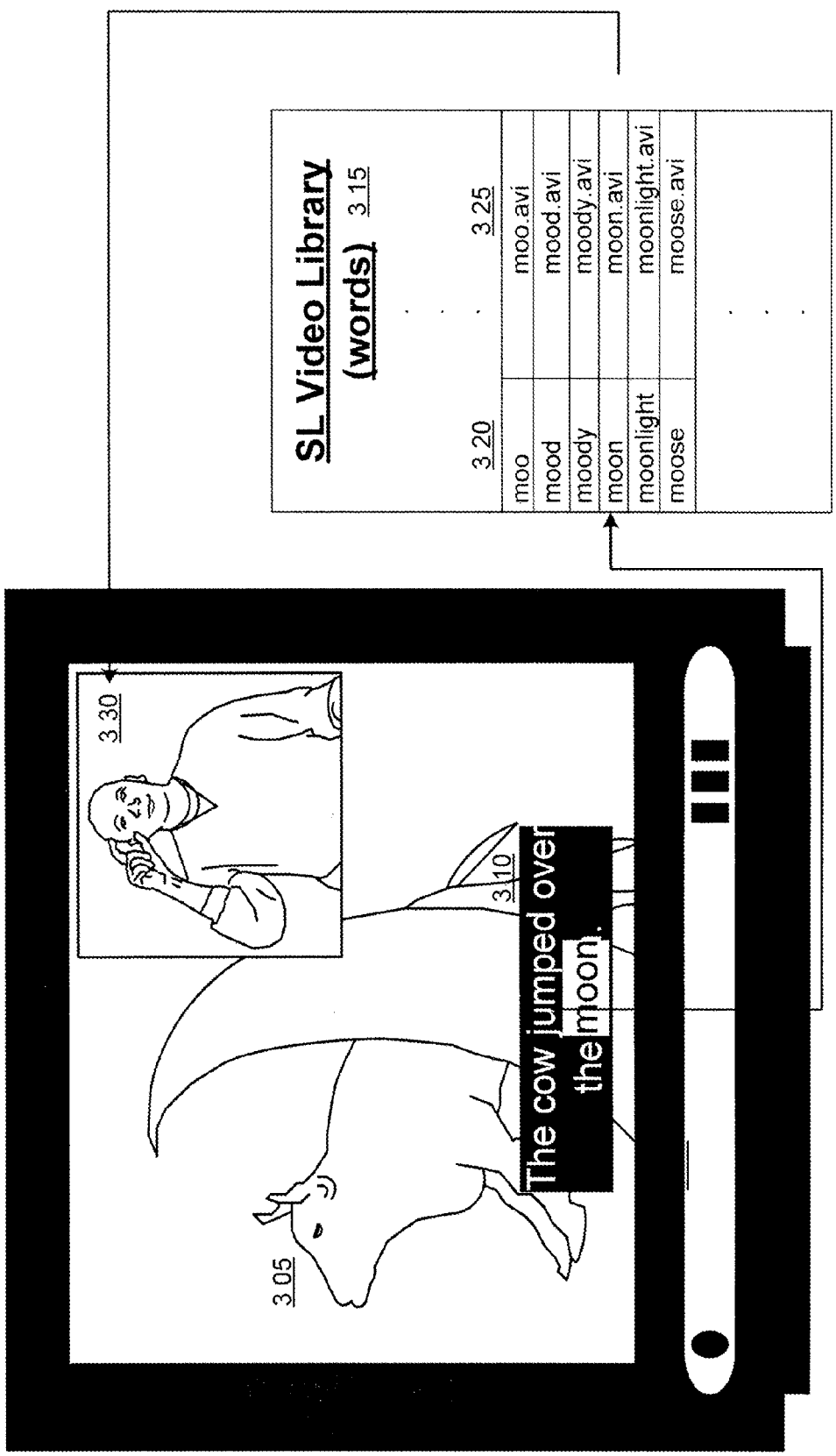
FIGS. 3a-d show output of sign language (SL) video clips to the screen of a display device as a picture-in-picture style window in four embodiments.

In one embodiment, the translation platform may be configured to output SL video clips to the screen of a separate display device or to a display of the translation platform. For example, in some implementations, the outputted video clips may be displayed as a picture-in-picture style window. Examples of these types of implementations are shown in FIGS. 3a-d. In FIG. 3a, a television 301 displays video content 305 with corresponding Closed Captioning text 310. The highlighted word, "moon", is the current word under consideration by the translation platform. The SL video library 315 may be queried to find this word among a list of words 320 with corresponding SL video clip files 325. In the figure, the video clip format is designated as .avi, but any suitable video file format may be employed within different implementations of the present invention. Once the appropriate SL video clip has been selected, it is routed to the video input of the television 301 and displayed as a picture-in-picture window 330.

Figure 3B:
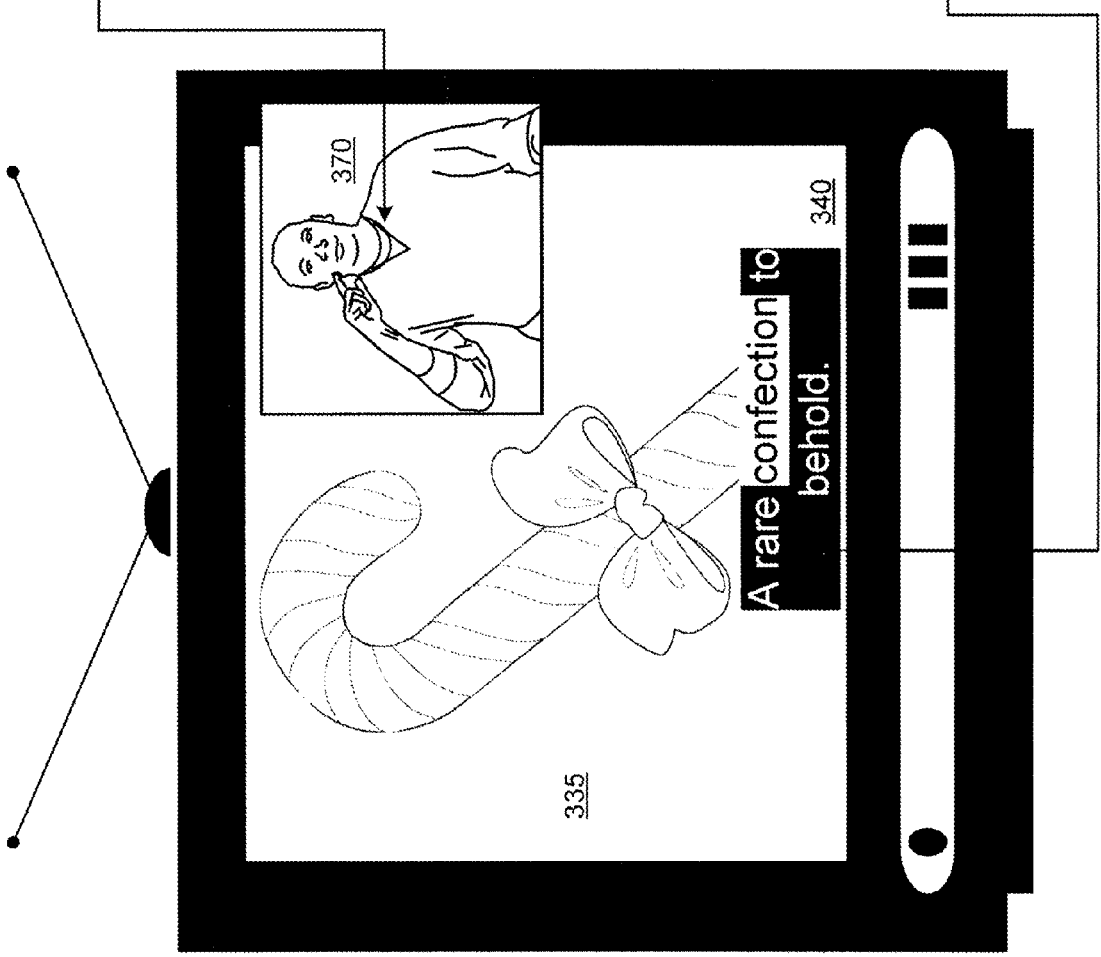

In FIG. 3b, illustrates aspects of the translation platform in a situation wherein the current word is not, itself, found in the SL video library. Here, an object in the video display 335 is described in the Closed Captioning 340 as a "confection". It is assumed in this illustrative example that the term "confection" does not exist in the SL video library.

Consequently, the similarity engine (120 from FIG. 1) queries the thesaurus database 345 to identify synonyms for the word. In one embodiment, the translation platform checks each synonym for a given word for existence in the SL video library in the order in which they are listed in the thesaurus DB until one is found that exists in the SL video library. In the case shown in FIG. 3b, the first synonym for "confection" is "candy" 350, which has an SL video library 355 entry in the list of words 360 with corresponding video clips 365. Consequently, the video clip corresponding to "candy" is selected, retrieved (candy.avi) and output to the display screen within a picture-in-picture window 370.

Figure 3C:
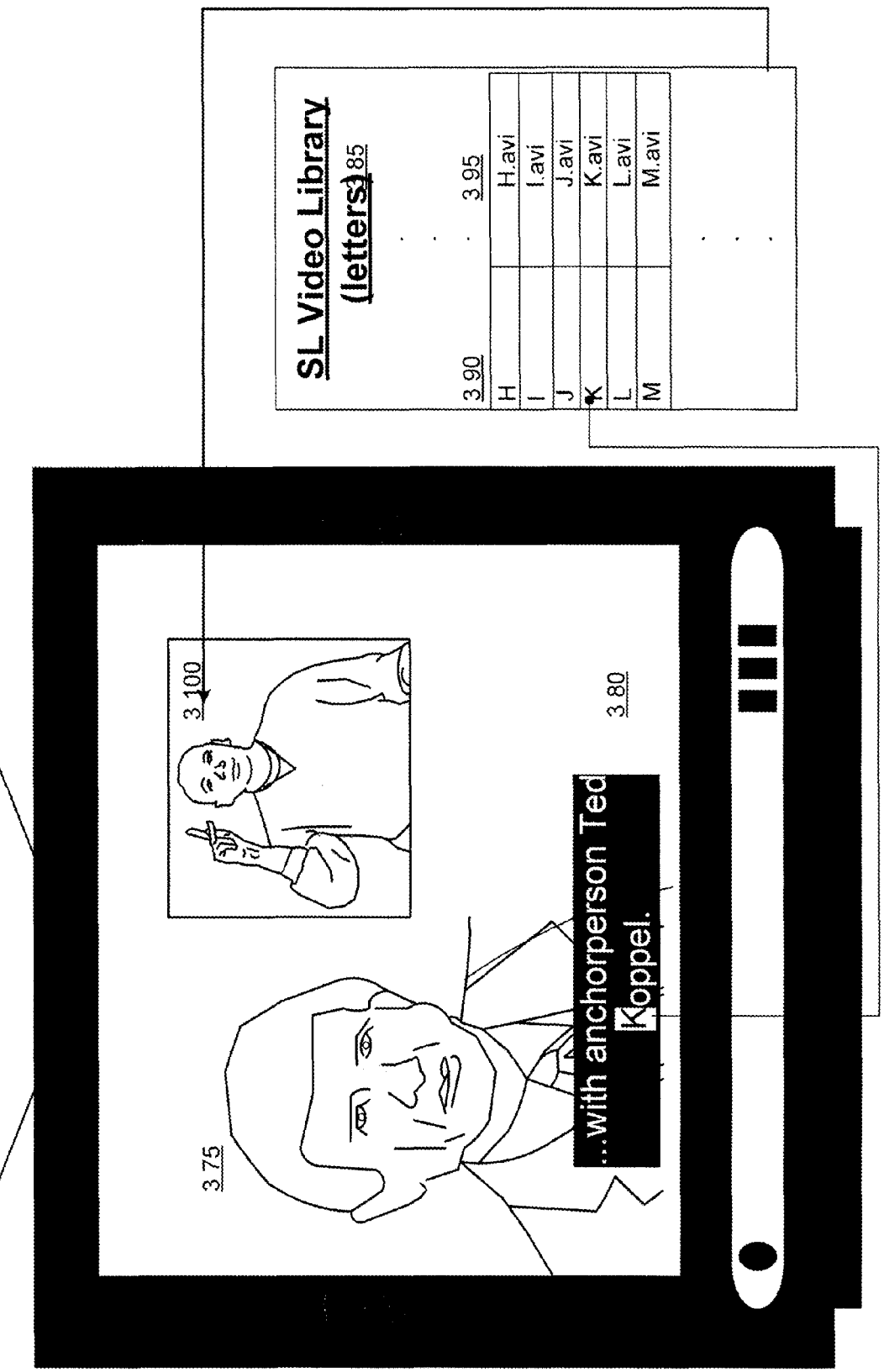

In FIG. 3c, illustrates aspects of the translation platform in a situation wherein the current word or phrase is not found in either the SL word video library or the thesaurus DB. In this case, the translation platform will decompose the word into its constituent parts (e.g., sub-words, letters, numbers, etc.) and play videos corresponding to each part (e.g., each letter) in the word. In some instances, this is similar to the sign language practice of fingerspelling for expressions that lack established signs. In some embodiments, the user may be given an opportunity to define a translation (e.g., specify an SL video clip or sequence of SL video clips) to be subsequently used for the word or phrase. In the FIG. 3c, the video display shows television anchorperson Ted Koppel 375, with corresponding description in the Closed Captioning 380. After checking the SL word video library, and the thesaurus DB, the translation platform breaks down the last name "Koppel" into its constituent sequence of letters (K-O-P-P-E-L) and queries the SL video library 385 for letter entries 390 with corresponding SL video clips 395. The SL video clip corresponding to each letter in the sequence is extracted and routed in order to the display screen picture-in-picture window 3100.

In one implementation, the current word, phrase, letter, number, punctuation mark, and/or the like for which an SL video clip is being played in the picture-in-picture window is also highlighted in the Closed Captioning display. In another implementation, limited and/or selective highlighting of speech elements occurs. In yet another implementation, no highlighting occurs.

Dialogue and Tone of Voice

Figure 3D:
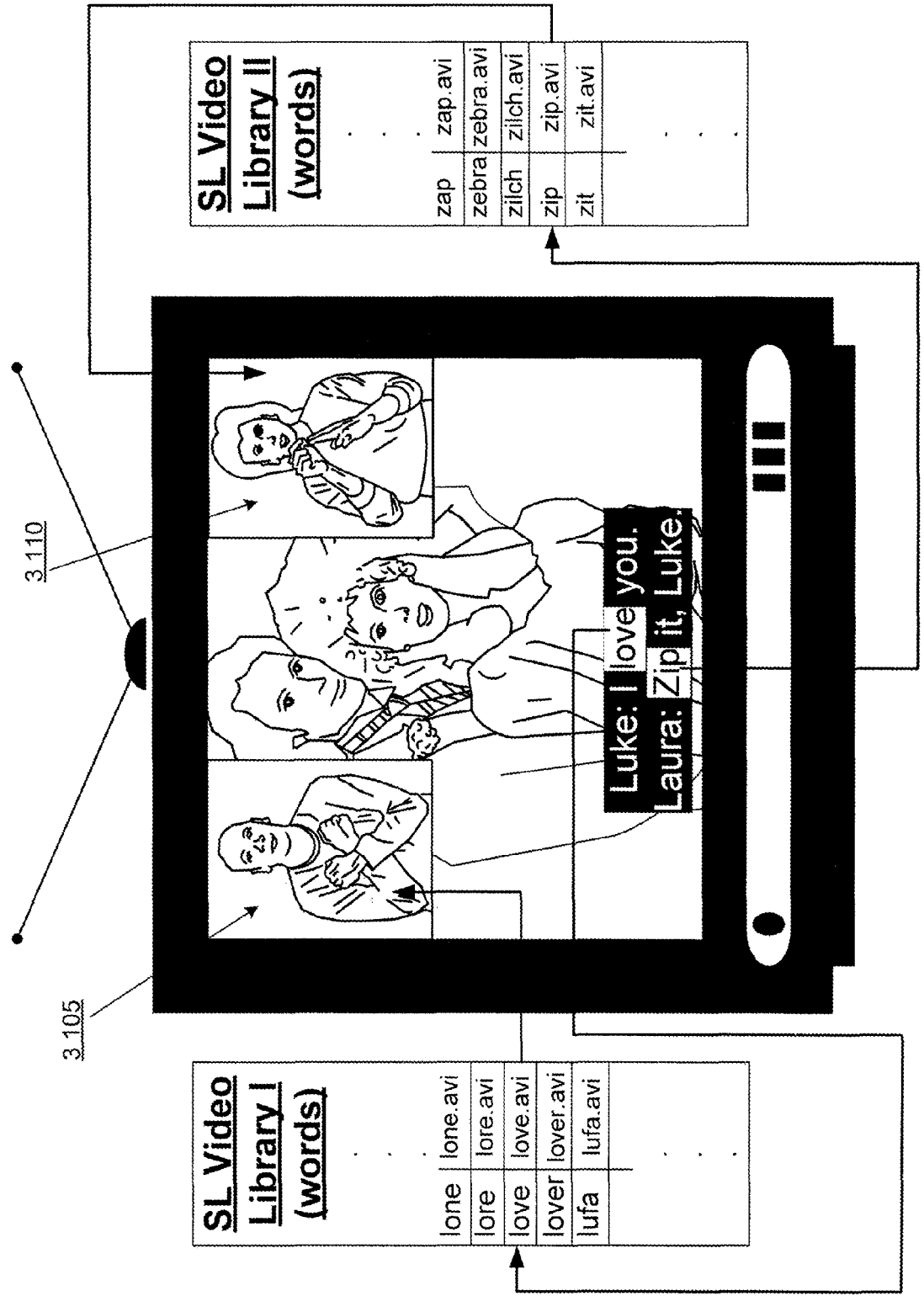

FIG. 3d illustrates aspects of the translation platform output configured to manage multiple written speech sources (e.g., different speakers) or tones of speech.

In one embodiment, the translation platform may detect multiple speakers in a Closed Captioning feed, such as by detecting colons, which are often used to separate the name of the speaker from the actual speech, and the names that precede them. When multiple speakers are detected, the translation platform may alternately display and/or create additional picture-in-picture SL video clip display windows to correspond to each of the speakers (3105, 3110). In one implementation, the size of the SL video clip display windows are adjusted to accommodate the introduction of new windows.

In another embodiment, the characteristics of signing figures in the SL video clips may be chosen based on the characteristics of speakers in the broadcaster feed to the extent that identification of speaker characteristics are possible. For example, the rules database may contain lists of male and female names, and the translation platform may be able to identify the gender of the speaker by matching the name before a detected colon to names in those lists. The translation platform may then selectively choose SL video clips with male or female signing figures depending on whether the speaker's gender is male or female respectively. This is illustrated in FIG. 3d, wherein the speech of the male and female speakers (Luke and Laura) are represented by male and female figures in SL windows 3105 and 3110 respectively. In one implementation, the different SL figures are stored in separate SL video libraries (I and II for male and female respectively in the figure).

In another embodiment, the translation platform may detect tone of voice and adjust SL video clip display window properties accordingly. Closed Captioning feeds often include qualifiers that specify the tone or volume of speech, for example by putting "(yelling)" or "(whispering)" before a sentence. Some embodiments further take into consideration the context of the information being translated and/or the presentation of the information to be translated when performing the translation. For example, in some implementations, the translation platform evaluates the information to be translated to determine whether parameters can be obtained or detected that can be used in translating the information. In some instances, for example, the translation platform can consider and/or track a speaker's volume, pace of speech, intensity and other such parameters when the information being translated is audio, audio recording, video or the like. Similarly, variations in these parameters can be detected, tracked and/or identified. The parameters and/or variations can then be used in implementing the translation. In some embodiments, the translation can change a color of text presented or a boarder of a display window to represent a change in temperament and/or intensity, bold or change font of text, and/or other such changes in an effort to portray and/or represent one of more parameters and/or variations in parameters. Similarly, when an avatar is used to present the sign language translation, facial expressions of the avatar, the pace of the avatar, the intensity of the avatar can be defined to portray some of these parameters and/or changes in parameters (e.g., detect based on volume, pace, intensity that a user is happy or mad, and modify the facial expressions of the avatar to reflect the detected parameter(s)). Additionally, some embodiments may include different video clips of sign language translations for a single word or phrase with the actor portraying anger, happiness or the like when performing the translation, and the translation platform can select the relevant video based on the detected parameters and/or changes of parameters.

Further, some embodiments allow a user to define and/or customize how the translation platform represents and/or portrays these parameters. In some implementations, the translation platform may provide a user interface that allows a user to select a color and/or specify that bold text is to be used to represent when a speaker is angry. Similarly, a user can define using a larger text when a speaker is yelling. The user interface may allow a user to define how an avatar is to be displayed to portray parameters relative to a speaker and/or the environment.

The rules database may contain lists of common qualifiers which may be detected by the grammar engine. Detection of a qualifier may trigger an adjustment in the SL video clip display window properties. For example, a recognized qualifier may trigger the translation platform to modify the brightness, sharpness, or color balance for the SL video clips corresponding to the subsequent written speech to be changed (e.g., shifting to red for yelling, shifting to blue for whispering, etc.). In another example, a recognized qualifier may trigger the translation platform to modify the size of the SL video clip display window (e.g., larger for yelling, smaller for whispering).

Real Time Processing

The translation platform may be configured to process written speech input, such as Closed Captioning feeds, in real time as they are received. This is facilitated in part by the use of the similarity engine and thesaurus database, which allow the SL video database to contain fewer entries than a more comprehensive SL video database that would be required in the absence of these elements. Despite this aspect, however, discrepancies between SL video clip timing (including processing time as well as the timing of the video clips themselves) and video/audio/Closed Captioning timing may lead to unacceptably large lags or advances between the broadcaster output and the translation platform output. This may be particularly true for fingerspelling of names or unrecognized speech elements.

Consequently, the translation platform may be configured to detect and/or correct for such timing discrepancies.

In one embodiment, detection of timing discrepancies proceeds by counting the number of speech elements (e.g., words) between the current word being displayed in the SL video clip window and the first word displayed in the broadcaster's Closed Captioning display. In another embodiment, the translation platform may associate a timer with the broadcaster's Closed Captioning display and a second timer with the SL video clip display that is correlated with the first timer in such a way that the time on the second timer while showing an SL video clip corresponding to a particular speech element will equal the time on the first timer when that speech element was shown in the Closed Captioning display. In some embodiments, the system may be configured with a variety of system streamline thresholds based on a series of different timing discrepancy values. The translation platform may be configured to implement different timing discrepancy values for different types of media feed (e.g., different values may be implemented for a news video feed, as opposed to a dialogue from a soap opera).

Correction of timing discrepancies may proceed in a number of different ways within various embodiments of the present invention. In one embodiment, the SL video clip window jumps discontinuously to the first word in the Closed Captioning display once the timing discrepancy exceeds a pre-designated threshold value. In another embodiment, the viewer may initiate the discontinuous jump, such as by pressing a remote control button. In another embodiment, the SL video clips are sped up or slowed down to reduce the degree of discrepancy. A playback speed function that is dependent on the timing discrepancy variable (e.g., the difference between the first timer and second timer within the time embodiment described above) may be pre-programmed into the translation platform. In another embodiment, the viewer may fast-forward, slow, stop, or rewind the SL video display window. Additionally or alternatively, some embodiments further compensate for delays in translation by slowing and/or pausing the playback of the information being translated. For example, when the information being translated is audio or audio from a video, the playback of the audio and/or the video can be slowed. Often, the audio and/or video can be slowed without adversely affected the playback and/or without being noticed by a viewer.

In another embodiment, certain words, when detected, are not converted to SL video clips to save time. For example, articles of speech such as "a", "an", "the", and/or the like may be neglected by the translation platform. In yet another implementation, a word-drop threshold may be implemented (e.g., every fifth word may be dropped from the conversion process). This may result in a reduced performance factor. However, it is noted that the effect will be significantly reduced the greater the distance between drops (e.g., dropping every eighth word has less of a performance impact than dropping every third word). Furthermore, in some implementations the system may implement this type of processing only when a timing discrepancy is identified. As such the system may process at a one to one element ratio, drop in to a six-word word-drop threshold and then step back into a one to one element ratio once the discrepancy has been corrected.

In some embodiments, prior to dropping one or more words, the translation platform evaluates the one or more words to be dropped and/or one or more words around the one or more words to be dropped to determine whether the word or phrase is a word or phrase of significance. Often a word used in one context may be significant while in other contexts may not be of as much significance. As such, some embodiments evaluate a word or words to determine whether a word or phrase has greater significance than other words proximate the significant word or phrase. Based on a determined significance, the translation platform may select words or phrases to be dropped while translating other words or phrases that are of more significance in an attempt to provide the user with a better comprehensive translation than might otherwise provide. Further, some embodiments allow a user to define significances and/or define some priority for words and/or phases to be considered when the translation platform has to drop one or more words in attempts to maintain synchronization with the information being translated. Further, the translation platform can take into consideration the amount of information and/or the size of the delay that has to be compensated for in addition to the significance and/or priority of words in determine which words and/or phrases are to be dropped.

Moreover, it is to be understood that various combinations of these corrective measures may be implemented in a variety of combinations to optimize the discrepancy correction process and minimize the impact of translation platform performance.

Video Clip Continuity

Stringing together sequences of video clips can pose problems of continuity.

This can be particularly troublesome for SL video clips, as jerky movements at the interstices between clips can lead to viewing difficulty, mistranslation, and/or the like. The translation platform may be configured to reduce and/or eliminate such problematic discontinuity issues.

FIG. 4 shows a solution to the problem of video clip discontinuity in one embodiment of the translation platform, wherein the signing figure adopts the same neutral element (e.g., the figure's hand) position at the beginning and end of every SL video clip. In the example of FIG. 4, the video clip begins at 401 with a first frame in which the signing figure holds hands together in front, followed at 405 by the SL video clip content itself (in this case, the sign for "moon"), and concluding at 410 with a closing frame in which the signing figure assumes the same pose or gesture as at 401. This technique, together with other measures such as consistent framing of the signing figure, clothing, facial expression, and/or the like, may help to ensure minimal discontinuity between SL video clips.

In another embodiment, morphing software such as xmorph may be employed to continuously connect the closing frame of one live SL video clip with the opening frame of the next SL video clip in the sequence.

Grammar Engine

A grammar engine (110 from FIG. 1) and associated rules database (115 from FIG. 1) may be employed for implementing rules and/or trends of speech. The grammar engine and rules database may facilitate a number of different functions and/or in various combinations within embodiments of the translation platform.

In one embodiment, the grammar engine and/or rules database may delineate a word hierarchy, quantifying commonality of word occurrences. For example, the 500 most commonly occurring words may be specially designated within the grammar engine and/or rules database for quick and easy identification and access within the translation platform.

In another embodiment, the grammar engine and/or rules database may specify rankings for synonyms within the thesaurus database. Selection of synonyms from the thesaurus database may, then, be weighted based on these rankings.

In another embodiment, the grammar engine and/or rules database may facilitate disambiguation of multiple translation possibilities. This may be accomplished, for example, by populating the rules database with selection rules for commonly confused words. For example, if the current word under consideration by the translation platform is "bark", it may be initially unclear whether the term refers to the skin of a tree or to the sound that a dog makes. The rules database may contain an entry for "bark" that, for example, specifies that the grammar engine is to search nearby words in the Closed Captioning feed for "dog" or "tree", and to assign the proper definition to the word based on which of the two is found. If neither is found, the rule may specify that the more common usage is to be applied. The grammar engine may also perform other context processing functions, such as checking words near the current word in order to determine the current word's lexical category, linguistic category, part of speech, etc.

In another embodiment, the rules database may contain records of common phrases, expressions, and/or other common combinations of words. When an SL word DB element or ambiguous current word is encountered, the word may be checked, together with surrounding words in the Closed Captioning feed, against such records to determine whether it is part of a common phrase. If so, this allows for a quick determination of video elements that will follow the word element or deciphering the intended meaning of the ambiguous term. In one implementation, a match in the Closed Caption feed to a word record that is identified as an introductory word of a common phrase may automatically trigger the playback the full sequence of SL video clips corresponding to the words in that phrase.

In another embodiment, the translation engine may be configured to discern capitalization of input written speech. This may be useful, for example, in distinguishing proper names from common words. For example, "Rob" may mean "to steal" or may be a diminutive form of the name "Robert". If an unusual capitalization of this or similar speech element is detected, such as a capitalization in the middle of a sentence, then the translation engine may discern that the speech element refers to a proper name rather than a common word. Characteristics of unusual capitalizations may be delineated within the rules database.

In one embodiment, all written speech elements corresponding to proper names are expressed by the translation platform via fingerspelling.

Translation Platform Controller

Figure 5:
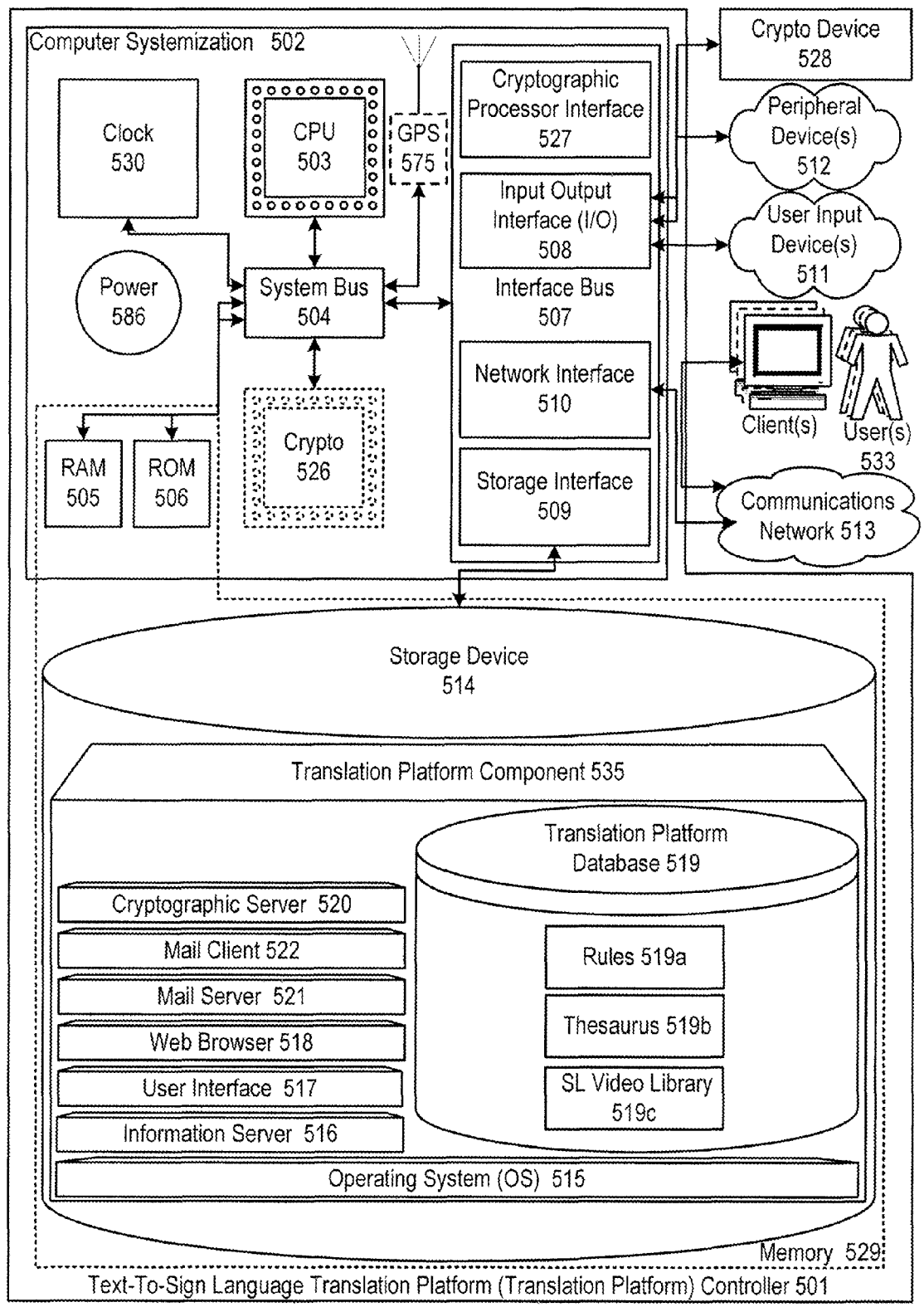
FIG. 5 is a block diagram illustrating embodiments of a translation platform controller in accordance with some embodiments.

FIG. 5 of the present disclosure illustrates inventive aspects of an exemplary translation platform controller 501 in a block diagram in accordance with some embodiments. In this embodiment, the translation platform controller 501 may serve to aggregate, process, store, search, serve, identify, instruct, generate, match, and/or update databases, database elements, database element fields, and/or other related data.

Typically, users, which may be people and/or other systems, engage information technology systems (e.g., commonly computers) to facilitate information processing. In turn, information technology systems employ one or more processors to process information. In some embodiments, the one or more processors is or includes a central processing unit (CPU), a microprocessor, control logic and other such processing systems or combinations of such systems. A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the translation platform controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pi co networks, Wide Area Networks (WANs), Wireless Networks (WLANs), etc. For example, the Internet is generally accepted as being an interconnection of a multitude of networks whereby remote clients and servers may access and interoperate with one another.

The translation platform controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, are all interconnected and/or communicating through a system bus 504. Optionally, the computer systemization may be connected to an internal power source 586. Optionally, a cryptographic processor 526 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like.

Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the translation platform controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the translation platform thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (110) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) AT A(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 113, the translation platform controller is accessible through remote clients 533b (e.g., computers with web browsers) by users 533a. Network interfaces may employ connection protocols such as, but not limited to: direct connect, Ethernet (thick, thin, twisted pair 10110011000 Base T, and/or the like), Token Ring, wireless connection such as IEEE 802.11a-x, and/or the like. A communications network may be anyone and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT;

PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like.

Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the translation platform controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the translation platform controller. A MC68HC 16 microcontroller, commonly manufactured by Motorola Inc., may be used for and/or within cryptographic units.

Equivalent microcontrollers and/or processors may also be used. The MC68HC 16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the translation platform controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID>>; and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the translation platform component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the translation platform controller.

Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the translation platform controller to communicate with other entities through a communications network 513. Various communication protocols may be used by the translation platform controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS); Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the translation platform controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the translation platform database 519, operating systems, other program components, user interfaces, Web browsers, and/or the like.

Access to the translation platform database may be achieved through a number of database bridge mechanisms such as through scripting languages as enumerated below (e.g., GCI) and through inter-application communication channels as enumerated below (e.g., CORBA, WebObjects, etc.). Any data requests through a Web browser are parsed through the bridge mechanism into appropriate grammars as required by the translation platform. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the translation platform as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 517 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like.

The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the translation platform enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to:

Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the translation platform.

Access to the translation platform mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the translation platform may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file.

A cryptographic component may communicate to and/or with other components in a component collection, including itself, and/or facilities of the like. The cryptographic component supports encryption schemes allowing for the secure transmission of information across a communications network to enable the translation platform component to engage in secure transactions if so desired. The cryptographic component facilitates the secure accessing of resources on the translation platform and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Translation Platform Database

The Translation Platform database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the translation platform database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the translation platform database is implemented as a data-structure, the use of the translation platform database 519 may be integrated into another component such as the translation platform component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-c.

A Rules table 519a includes fields such as, but not limited to: word hierarchies, phrase hierarchies, synonym rankings, name lists, speech qualifiers, SL video clip output rules, and/or the like. A Thesaurus table 519b includes fields such as, but not limited to: input word, synonyms, antonyms, homographs, and/or the like. A SL Video Clip table 519c includes fields such as, but not limited to: input word, video clip file and/or file location, and/or the like. These and/or other tables may support and/or track multiple entity accounts on the Platform.

In one embodiment, the translation platform database may interact with other database systems. For example, employing a distributed database system, queries and data access by Translation Platform modules may treat the combination of the translation platform database and another database as a single database entity.

In one embodiment, user programs may contain various user interface primitives, which may serve to update the translation platform. Also, various accounts may require custom database tables depending upon the environments and the types of clients the translation platform may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-c. The translation platform may be configured to keep track of various settings, inputs, and parameters via database controllers.

The translation platform database may communicate to and/or with other components in a component collection, including itself, and/or facilities of the like. Most frequently, the translation platform database communicates with the translation platform component, other program components, and/or the like. The database may contain, retain, and provide information regarding other nodes and data.

The Translation Platform

The translation platform component 535 is a stored program component that is executed by a CPU. The translation platform affects accessing, obtaining and the provision of information, services, transactions, and/or the like across various communications networks.

The translation platform component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the translation platform server employs a cryptographic server to encrypt and decrypt communications. The translation platform component may communicate to and/or with other components in a component collection, including itself, and/or facilities of the like. Most frequently, the translation platform component communicates with the translation platform database, operating systems, other program components, and/or the like. The translation platform may contain, communicate, generate, obtain, and/or provide program component, system, user, and/or data communications, requests, and/or responses.

Distributed Translation Platform

The structure and/or operation of any of the Translation Platform node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of anyone of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the translation platform controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, remote, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

Further, some embodiments provide a conversion, translation or the like of substantially any type of communication and/or information into sign language or to another form of information data or communication. Additionally, the translation or conversion can be implemented in real time. Still further, in some implementations, information to be translated is capture in real time and the translation provided in substantially real time. As described above, in some instances, delays can be compensated for in the translation and/or presentation of the translation.

Some embodiments provide methods and systems to capture one or more electronic forms of communication, and then translate the communication into a sign language format (e.g., through the use of video clips, animation and/or avatar). As described above, the sign language format can comprise one or more video clips or segments that are sequentially played back to be viewed by a user. Other embodiments generate code to control the display of an avatar that performs the relevant SL elements and/or sequences acting out an avatar clip or segment. Similarly, the conversion can allow some embodiments to additionally or alternatively perform translations to other formats of information and/or communication (e.g., converting audio content to text and communicate the text (e.g., e-mail, text message, fax, closed captioning, etc.), text to audio, and other such conversions. Further, the conversion performed by at least some embodiments provide such conversion in real time, such as with live captured content, live broadcast content, and/or other such situations where real time conversion is important.

Figure 6:
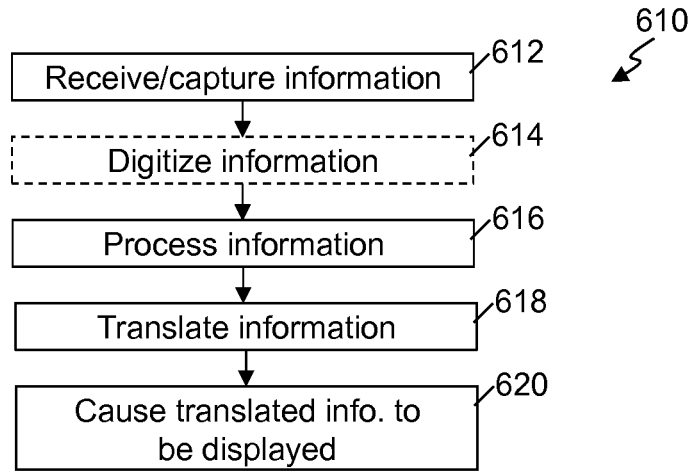
FIG. 6 depicts a simplified flow diagram of an exemplary process of providing one more users information in sign language, in accordance with some embodiments.

FIG. 6 depicts a simplified flow diagram of an exemplary process 610 of providing one more users information in sign language, in accordance with some embodiments. Although FIG. 6 is described with reference to translating into sign language, the process can be used to translate into substantially any relevant format. In step 612, information is received and/or capture. In many embodiments, the information is received at a processing device over a communication medium or connection, obtained from stored content, detected and/or other such methods. For example, the information can be detected as audio content. In other instances, the information may be received as a communication, for example, over a distributed network such as but not limited to the Internet, WAN, LAN, etc., over a wireless communication link or network, or other such communication or combination of such communications. In some embodiments, some or all of the information is pre-scanned and/or pre-stored prior to implementing the translation.

In step 614, the information is digitized when the information is not already digitized. For example, when the information is detected as audio content, the audio content can be captured and converted to a digital representation of the audio content. As one exemplary example, some embodiments convert captured audio speech to digital text. In some embodiments, the digitizing includes identifying the type and/or format of the information to be translated.

In step 616, the received information is processed to identify speech elements or terms to be translated. For example, when the information is audio information, the audio information is processed to identify one or more speech elements (e.g., such as through a voice recognition application). Similarly, when the information is textual, optical character recognition can be performed on the information. Further, the identification of speech elements can include, for example, identifying one or more words, identifying one or more phrases, identifying one or more numbers, identifying relevant sign language identifiers and/or representations corresponding to the speech elements and/or the information, recognizing predefined movement of a person in video, recognizing words in text, recognizing punctuation, and the like. Some embodiments are configured to receive information is multiple different formats. Accordingly, the identification of such speech elements can be dependent on the format in which the information is received and/or into which it is digitized. In some instances, the processing includes identifying the format of the information and processing the information in accordance with the received format to extract one or more speech elements from the information.

In step 618, the information is translated, where the speech elements and/or identified information are processed to identify the translated information to be provided (e.g., information to be provided in sign language). Again, some embodiments are configured to translate information into one or more different formats and/or languages. As such, some embodiments identify a second format, language, etc. to which the information is to be translated. The translation often further includes accessing the one or more libraries 135 and/or databases 115, 125 through the platform controller 105 and/or using one or more of the engines 110, 120, 130, 150, and identifying relevant translated speech elements, video clips, avatar code, sign language identifiers, other identifiers and/or other such representations corresponding to the speech elements and information. Further, the processing can include identifying contractions (e.g., "u" instead of "you", use "ur" instead of "you're", etc.), acronyms and the like. As described above, the sign language identifiers can correspond to prerecorded video clips, instructions and/or code used in defining sign language movements and implementing an avatar, identifiers to be used by a playback device in selecting and accessing video clips and/or avatar codes, or other such identifiers. Again, the translation can include utilizing the databases, libraries and the like. For example, the translation can include identifying a translation element (e.g., one of the one or more sign language identifiers) directly corresponding to a synonym of one or more of the speech elements. As further described below, in some instances, one or more of the identified translation elements can be user created, defined and/or customized.

In some embodiments, the translation platform translates the initial information into an intermediate format as part of the processing. For example, audio content can be converted to textual content (e.g., through a voice recognition software). Similarly, an OCR process may be applied to an image and/or text to identify text that is then converted to the sign language. In some embodiments, the translation engine 130 includes licensed OCR software and/or applications to perform text capture of information to provide an intermediate text content. OCRing may also be applied to one or more frames of a video or other information.

In step 620, the translated information is caused to be presented to the user. For example, the sign language is presented to one or more users (e.g., video segments and/or an avatar is displayed and/or played back on a display). As described above, in some implementations, the translation platform may be partially or fully implemented on a device or system that is separate from the displaying device. As such, the translation platform can be configured to forward (e.g., communicate the information over a distributed network, stream over the Internet, communicate the information over a wireless network, or the like or combinations thereof) the translation and/or identifiers such that the displaying device can display the translation (e.g., receive or acquire video clips, implement avatar code, playback audio, etc.). Accordingly, information is received, translated and provided to a user, for example, in sign language. The process 610 can be performed in real time providing users with an immediate response and playback of the sign language. Accordingly, users can take advantage of the process 610 is numerous different situations and/or environments. In other implementations, the translation can be performed in pre-recoded content with or without time constraints on the translation process.

The information to be translated can be substantially any relevant information that is received, detected or can be converted to an electronic format. For example, original information can be received as closed captions, HTML, e-mail, text messages, e-books, written text, audio, video, images, photographs, scans, Quick Response (QR) codes, bar codes, live speech, sign language, social network communication and/or other such relevant information. Further, the source of such content can be from substantially any relevant source, such as but not limited to, broadcast content, web or Internet content, smart or cellular phones, tablet, RFID tags, application software (APP) useable on a smart phone, tablet, computer or the like, video games, audio and/or video recorders, Internet services (e.g., social networking services), and other such sources. Further, the translation can be performed by a user's device capturing the relevant information, by one or more services or servers in communication with the user device, by a broadcaster that translates the information prior to communicating the translated information to a playback device, or other such translating devices, or a combination of these systems or devices.

As described above, in some implementations, the translation platform can provide translation for information received through a social networking service (e.g., social networking website). In some implementations, the translation platform is incorporated into the social networking service and/or servers. In other embodiments, a web browser extension or an application that works with a web browser provides some or all of the translation platform. The translation provided can be in response to the social networking service knowing (e.g., through a user profile and/or a user's past interaction with the social networking service) that a particular user need and/or wants the translation performed. The translation can be automatically provided, for example, in response to detecting a specific user. In other instances, the translation is implemented in response to a user selecting certain information and/or designated that a certain type of information is to be translated and the format to which the translation is to be performed. Further, in some embodiments, a user can specify in a user profile of the social networking service that translation is to be performed, what information and/or types of information are to translated, and a format to which the translation is to be performed (e.g., from audio to sign language).

Figure 7:
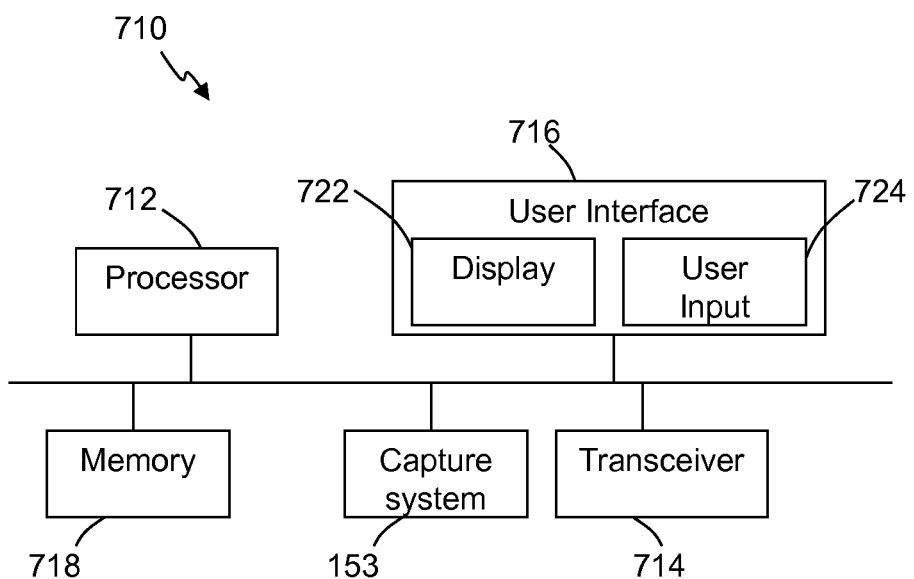
FIG. 7 depicts a simplified block diagram of a user device, in accordance with some embodiments.

FIG. 7 depicts a simplified block diagram of a user device 710 in accordance with some embodiments. The user device 710 includes a controller 712, one or more transceivers 714, a user interface 716 and an information capture system 153, and computer readable and/or processor readable storage memory 718. The user device is configured to capture information through the information capture system 153 and to communicate some or all of the captured information through a transceiver 714 to one or more services or servers 190. The servers 190 may be accessible over a local network (e.g., wired and/or wireless LAN) and/or over a distributed network (e.g., WAN, Internet, etc.).

The remote server 190 includes the translation platform 101 and/or is in communication with the translation platform 101, the grammar engine 110, rules database 115, similarity engine 120, thesaurus database 125, translation engine 130, SL library 135, spelling engine 150, etc. In some embodiments, the remote server further includes other databases, libraries and/or other relevant information to provide the translation. The remote server 190 can perform a translation of the captured information (e.g., identify SL video clips) and communicate the translated information (e.g., streaming the relevant SL video clips, and potentially timing information when relevant) to the user device to be played back on a display 722 of the user interface 716. In some instances, the user interface further includes one or more user inputs 724 such as but not limited to buttons, touch screen, touch pad, track ball, and/or other such devices or a combination of such devices to allow the user to interact with and control the user device 710.

The one or more transceivers 174 can be wired or wireless transceivers. Further, the transceivers can be configured to transmit the captured information to the remote service 190 and receive the translated information (e.g., SL video clips, SL identifiers, avatar code or the like) from the remote server, database and/or other source.

In other embodiments, some or all of the translation platform is implemented on the user device 710. For example, in some implementations, the user device 710 may provide processing to implement some or all of the grammar engine, similarity engine, translation engine and/or spelling engine.

Similarly, some or all of the databases and/or libraries may be locally stored at the user device. Alternatively, the user device may perform only a portion of the translation, such as just capturing, or capturing and performing an initial processing to digitize the information, or other such processing.

As described above, some embodiments use prerecorded video clips of words, letters, numbers, phrases, sentences, etc. Additionally or alternatively, some embodiments utilize an avatar that performs the SL word, phrase or the like. The use of the avatar can be advantageous in reducing the amount of content (e.g., video clips) stored, parsed to identify and/or communicated. Instead, the avatar code is provided and implemented by the playback device to display the avatar in playing back the translation.

Further, some embodiments provide improved presentation of the SL translation because the avatar code avoids having to return to the neutral position at the beginning and/or end of the clip. Instead, some embodiments utilize avatar transition code to control the displayed avatar to substantially seamlessly transition from one SL clip to the next. For example, an end position of a first SL clip can be determined and/or known (e.g., through metadata associated with the avatar code) and a starting position for a second SL clip can be determined and/or known. A transition avatar code can be identified and/or generated to provide a transition between the end of the first SL clip to the start of the second SL clip. As a result, the avatar playback limits or avoids the jumps between SL clips and improves playback, user experience and understanding of the translation. The selection or generation of a transition avatar code can take into consideration intended movement of an avatar from an end position of an avatar in first SL clip to a starting position of the avatar in a second subsequent SL clip (typically taking into consideration the anatomy of the avatar, e.g., finger(s), hand(s), arm(s), shoulder(s), face, etc.), or other such connections. In some embodiments, there may be multiple different avatar codes with different start and/or end neutral positions. The translation system selects one of the multiple avatar codes depending on a previous and/or a subsequent sign. Additionally or alternatively, some embodiments employ a morphing software, such as xmorph, that is configured to connect a closing frame of one live SL video clip with the opening frame of the next SL video clip in the sequence.

As one example, the platform and/or remote service can be configured to identify one or more end points of the anatomy of the avatar (e.g., finger(s), hand(s), arm(s), shoulder(s), face, etc.) of a first clip and one or more corresponding start positions of the anatomy of the avatar, and determine a movement between the end and start two points. Based on the movement, relative distance of the movement, the curve of the movement, pace of the information being translated and the like, the platform and/or server can calculate a number of frames to be included to provide representation of movement, and generate the number of frames with the relevant parts of the avatar's anatomy moved between the relative start and end positions.

As also described above, some embodiments take into consideration the characteristic of the information being translated. For example, some embodiments take into consideration whether a speaker is a female or a male. Similarly, some embodiments take into consideration a tone of voice (either through detection or identifiers provide in the information (e.g., notations in Closed Captioning). Accordingly, some embodiments utilize the characteristics when implementing the avatar. Again, the avatar can be portrayed as a female when a female is speaking, and a male when a male is speaking. Similarly, the facial expressions of the avatar can be adjusted to show emotion, such as narrowed eyes when angry, wide eyes when surprised, crying when sad and other such characteristics. Still further, the avatar can be portrayed as a child, a young adult, an elderly person, non-human character, or the like depending on the speaker, intended audience or other such factors.

Further, some embodiments customize or tailor the translation and/or presentation of the translation based on an intended user, the device performing the translation, the device playing back the translation and/or other such factors. In some embodiments, user profiles are generated (e.g., through a questionnaire, tracking a user's interaction and use of the translation system, etc.) and/or updated that can be used in customizing the appearance of playback, coloring, speed of output, language and/or other such factors. For example, some embodiments have a user generate an initial user profile, such as through a registration process and/or upon an initial activation. Further, some embodiments employ metadata that is maintained with and/or communicated with translation videos, translation identifiers, avatar code and the like. The metadata can specify parameters used in controlling playback and/or customizing the translation and/or the presentation of the translation for a user.

Again, there are numerous different parameters that can be obtained, tracked and/or modified over time that can be used in controlling and/or customizing the translation and/or presentation of the translation. Some of these parameters include, but are not limited to a speed of output and/or playback, a language type, a type of translation, a type of avatar and/or actor recorded in the pre-recorded videos (e.g., race, ethnicity, gender, age, etc.), location on a display screen where video and/or avatar are displayed (e.g., lower right corner), types of shortcuts, colors, colloquialisms, accessibility options, auto-start of the translation versus manually starting the translation, payment options, confidentiality settings, social network options, method of contact, whether to provide links to and/or to link other relevant information, types of links to provide when relevant, users' interests, users' current location, users' location of residence, time, users' access and/or account level, users' age, methods of compensating for delays, speed of translation, speed of presentation (e.g., speed of playback of video and/or the avatar), and other such parameters.

These parameters may be locally stored on a user device (e.g., a device locally providing the presentation of the translation and/or providing some or all of the translation), can be stored in a database accessible to a server or service, distributed over multiple devices or the like. Similarly, some embodiments communicate and/or distribute relevant portions of the user profiles to one or more relevant devices implementing the translation, providing the initial information to be translated and/or the device presenting the translated information. As introduced above, in some implementations, the translation system may be activated automatically. For example, when a user accesses a source of information, the source may recognize the user (e.g., a user log-in) and/or the device accessing the source (e.g., device and/or network address) and automatically activate the translation functionality at the server and/or in cooperation with the device.

Further, some embodiments are further configured to allow users to customize the translation provided. In some implementations, that user can define one or more custom translation elements for one or more speech elements or series of speech elements. For example, a user can define an association between a sign (i.e., one or more sign language actions) with a word, phrase or the like. As such, users are capable of defining custom translation elements (e.g., custom signs or SL actions). In some instances, for example, a user can define a custom sign or sign language clip to be associated as the translation for one or more speech elements. This can include, for example, defining a single sign or a series of signs (or actions) to be associated with a word, name, phrase, sentence or the like. Custom translations or custom translation elements can be beneficial in many instances, such as with speech elements that are not recognized by the platform and/or do not have a direct translation, speech elements that the user commonly encounters, speech elements that when translated are relatively long, speech elements that are spelled out, and/or other such situations. For example, a user can define a customized translation for a particular speech element or series of speech elements (e.g., the name of a person or place).

Figure 8:
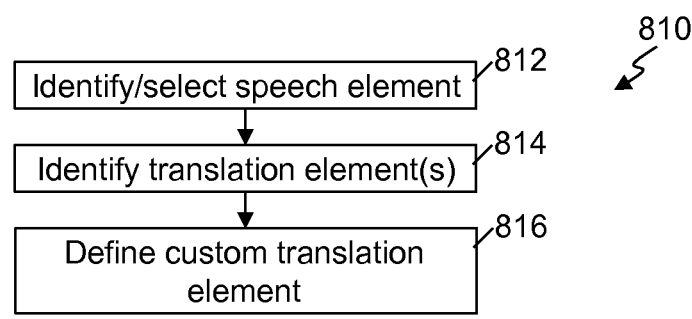
FIG. 8 shows a simplified flow diagram of a process of defining a custom translation element of one or more speech terms, in accordance with some embodiments.

FIG. 8 shows a simplified flow diagram of a process 810 of defining a custom translation element of one or more speech terms, in accordance with some embodiments. In step 812, a selection of a first speech element is received. In some instances, the user identifies a speech element or multiple speech elements to be associated with the custom translation element. In other embodiments, the translation platform may identify one or more speech elements for which it may be beneficial to define a custom translation element. In step 814, one or more translated elements (e.g., word, term, sign, etc.) is identified that is to directly correspond to the speech element (or multiple speech elements). For example, in some instances, a user selects through a user interface displayed on the displaying device one or more signs that is to directly correspond to a speech element. As described above, the custom translation element may provide a single sign, element, term or the like for multiple speech terms, and similarly, multiple signs, elements, terms or the like may be directly associated as the custom translation element for a single speech element.

In step 816, a custom translation element is defined to directly correspond to the one or more speech elements. For example, the custom translation element can directly associate one or more sign language identifiers of the selected one or more signs that were selected to directly correspond to the speech element. Once defined, the translation platform can utilize the custom translation element as the translation for the one or more speech elements in subsequent translations.

Some embodiments can further apply limits and/or conditions on when the custom translation element is to be used. For example, the translation platform can be configured to detect the speech term being used in a first context and know that in the first context the custom translation element is to be used, and when the speech term is used in a second context the custom translation element is not to be used. In some implementations, the user defines when a custom translation element is to be used and when it is not. In other instances, the translation platform may learn based on user feedback when to apply a custom translation. In some embodiments, the translation platform and/or one or more of the databases/libraries maintains a user defined lexicon and/or conditions for application of custom elements that can include conditions and/or context regarding when a custom term is to be applied (e.g., when to spell out a name or apply an abbreviation, etc.).

The ability to define customized translations (e.g., customized signs) can further allow a user to define a sign or avatar action to be performed and the defined sign can be designated as the custom translation element for one or more speech elements (e.g., words, phrases, slang and the like) that do not have a specific sign or brief series of actions. For example, with some words there is not a sign that correspond to the word. As a result, these words are often spelled out through SL actions one letter at a time. In one example, it is common to spell out peoples' names. Accordingly, a user can specify a sign and/or combine signs (e.g., a single SL action or a series of SL actions) that are defined as a customized translation to be used whenever the translation system is translating that name. For example, a Father with four sons named Jeff, Mike, Brian and David, could define a series of signs specifying "son" followed by a first letter of the specific son's name (i.e., the sign for "son" and the sign for "J" (for Jeff), the sign for "son" and the sign for "M" (for Mike), the sign for "son" and the sign for "B" (for Brian), etc.). Accordingly, the translation platform, when using pre-recorded videos for example, combines sign language video clip for "son" and the sign language video clip of the appropriate letter to provide the translation. Similarly, a user can define a sign or custom translation element to identify, for example, co-works by combining the sign for "work" and the first letter of the co-workers' first and last names (e.g., defining a customized translation for a co-worker named Jane Doe as the sequence of signs "work", "J" and "D"). Similar user customized translations or signs can be used with slang words, names of food, names of places, speech elements that a user frequently needs translated, work terminology, school terminology, and substantially any other such speech elements and/or series of speech elements.

In some embodiments, the translation platform recognizes speech elements and/or sequences of speech elements, and recommends that a custom translation element be defined to correspond to the recognized speech element or sequence. For example, in some implementations the translation platform is configured to track information and/or words being translated to recognize that a word or phrase is commonly translated. Similarly, the translation platform can take into consideration the time, number of video clips and/or avatar codes (e.g., number of letters when spelling out a word) and other such factors in determining whether to recommend that a custom translation element be defined. In some implementations, the translation platform recognizes that a series of speech elements occur more than a threshold amount of times (and in some instances, within a threshold period of time). For example, the platform can detect that a word and/or phrase is used more than ten times in a week, more than 20 times in a month, etc. Based on the detected use, the platform notifies the user and recommends that the user define a customized translation.

The platform can cache the custom translation elements and/or store the custom translation elements in one or more of the libraries and/or databases. The custom translation elements can be designated through a user interface and/or a user profile. In some embodiments, the translation platform may include and/or access predefined sets of lexicons from which the user can select a set of lexicon and/or one or more custom translation elements from the lexicon. For example, the platform may include a text message abbreviation lexicon that uses abbreviations that are commonly seen in text messages as the translations for words and/or phrases. In other embodiments, the platform may track words and/or phrases that are commonly translated and maintain a listing. The listing can be sorted, for example, based on frequency of use, time involved in translating, and/or other such factors. The user can view the listing and select words and/or phrases for which custom translation elements should be defined.

Additionally, in some embodiments, the translation platform further provides a recommendation of a custom translation for a word and/or phrase in response to the platform recognizing that it may be beneficial to define a custom translation element (e.g., detecting delays in presenting the translations relative to receiving the information to be translated, platform has to compensate for delays more than a threshold number of times associated with a speech element or series of speech elements, etc.). Similarly, in some embodiments the platform can be configured to recognize a speech element as a type of speech element (e.g., name) and/or an association of the speech element with something (e.g., the user's work) and propose a series of signs as the custom translation element.

Still further, in some embodiments, some or all of the custom translation elements may be communicated back to a central service (e.g., translation service, software developer, etc.) that tracks the custom translation elements. Based on the received custom translation elements the service can generate lexicons and/or vocabulary of custom translations that can be distributed to translation platforms for use by other users. Additionally or alternatively, when the translation platform proposes a custom translation element, the proposal may be based on other users' defined custom translation element.

Some embodiments additionally allow a user to create a new custom translation element (e.g., create a signs) and associate that newly created translation element with a speech element or series of speech elements. This creation of a new translation can, in some embodiments, be implemented as part of step 814 of the process 810. Again, in step 814, one or more translated elements are identified that is to directly correspond to the speech element. This can include an optional step of allowing a user to initiate a process to create a custom or new translation element, which often is dependent on the format into which the information is being translated.

For example, with those embodiments that display an avatar that acts out the translated signs, a user can define and/or create one or more actions that the avatar is to perform, and associate the one or more actions with a speech element (e.g., a word, phrase, sentence or the like). As one example, when a Mother has four children, a custom translated element could be define by a first custom sign comprising a single finger (i.e., "1") patted against the chest (or heart) to represent her first born child, define a second custom sign comprising two fingers (i.e., "2") patted against the chest to represent her second born child, and similarly define third and four custom signs comprising three fingers and four fingers patted against the chest to represent the third and fourth child, respectively. As another example, a teenager may define signs for current slang.

Still further, the custom translation element does not have to be technically accurate (e.g., combined signs do not have to be technically accurate), as long as the user understands the translation. For example, a user can define a sign for a company name (e.g., citi-group) to be a combination of the signs (e.g., "city" and "group") even though a direct translation is not technically accurate. Although the above is generally described with reference to customizing for sign language, the translation similarly is configured, in some embodiments, to allow user customization for translations other than to sign language (e.g., such as, but not limited to, audio to text, text to audio, etc.). For example, the user can specify a word in text and define a pronunciation for that is to be used in translation from text to audio. As another example, a custom translation element may be defined for a speech element in a spoken audio format to be translated to text by defining an abbreviated version of a word to be used instead of a fully spelled out word, such as abbreviations commonly seen in text messaging.

In some embodiments, the translation system provides a user interface that helps the user to customize and/or define signs. For example, a user interface may comprise a text entry field that allows a user to specify a speech element (e.g., term, word, phase, etc.) to be associated with a custom sign. Further, the system may allow a user to search for a corresponding translation (e.g., a corresponding one or more signs to be used, predefined videos, etc.). In other instances, the system provides the user with an avatar that the user can manipulate, for example, using a pointing device to select one or more hands, fingers, arms, and to position the fingers, hands, arms, etc. Still further, the user interface may be activated in response to a user activation of a help option or may automatically be activated, for example, in response to the same speech element, term, word, phrase being translated a predefined number of times. In yet other embodiments, an icon, animation or the like may be displayed reminding the user that the user can define customization and/or remind the user of the availability of user interface that allows the user to define customization. For example, a user interface may present to a user a listing of letters, word, phrases and the like that the user can select that are to be used to define the custom translation element. In response to a user specifying a potential custom translation element (i.e., one or more letters, words, etc.) the user interface can present the proposed translation (e.g., playback a sequence of pre-recorded videos, activate the corresponding one or more avatar codes, etc.) so that the user can confirm the proposed custom translation element. The user can then save the custom translation element and/or make further changes to the proposed custom translation.

Again, some embodiments are configured to provide translation from one or more types of information to one or more other types of information. Further, such translation can be performed locally, remotely, or partially locally and partially remotely. Similarly, some or all of the information to be presented as the translated information may be stored locally, or alternatively some or all of the translated information may be received from a remote source. Such translations can be utilized in numerous applications and/or situations. Some of such application include, but are not limited to, translations in a court, government facilities, schools, colleges, transportation centers (e.g., airports, train stations, bus stops and/or depots, subway stations, ports, etc.), banks, stores, and the like. Similarly, numerous devices can be used to access translation servers or serves and/or perform some or all of the translations. For example, some or all of the translation platform can be implemented in portable electronic devices (e.g., smart phones, tablets, laptop computers, portable device specifically designed for translation, navigation systems, etc.), computers, televisions, set-top-boxes, servers, and other such devices. In some embodiments, a building, facility, service can provide a predefined telephone number or WiFi connection that a user can connect with in order to directly receive the input information to be translated (e.g., public announcements, audio of the lecture, audio from a court proceeding, text from a stenographer in a court proceeding, etc.). As such, a user's device (e.g., user's smart phone) does not have to capture the information (e.g., audio). In other embodiments, the user may be provided with an access code to access service, similar to an on-line meeting service (e.g., gotomeeting, WebEx, etc.), with the information to be translated provided through the service and/or the some or all of the translation actually performed through a translation platform implemented by the service. In some implementations, a user would utilize an application on a smart phone, tablet, computer or the like to gain access to the service.

Further, the translation can be a translation of recorded information, such as pre-recorded audio and/or text. Alternatively or additionally, some embodiments are configured to provide live translation in real time, such as during a lecture, presentation, a live conversation between two or more people (whether in person or over a communication system or network, such as over the phone or Internet), streaming content, and other such live information. Again, with some embodiments, some or all of the translation can be performed local at the playback/display device, while with other embodiments some or all of the translation is performed remotely and provided to a device to be presented to the user (e.g., video played back and/or avatar application activated). For example, in some embodiments, a device can capture live information (e.g., audio record a live conversation, video of a live conversation), digitize some or all of the information when relevant, and forward the digitized information to a remote device and/or service to be translated. The remote device and/or service preforms the translation in real time, which can include utilizing one or more databases, libraries, rules, procedures and the like. The remote device and/or service then returns the translated information and/or translation identifiers to the local device to be presented by the local device and/or used by the local device to identify relevant translation information and/or code to present the translation to the user (e.g., identifiers of video clips, identifiers of avatar code, identifiers of SL clips, etc.).

Again, the translation can be from substantially any relevant information that can be digitized, and the translation can be to sign language or substantially any other relevant information format or type. For example, the translation can be from audio to text, from audio to sign language, from audio to audio in another language, from an image or series of images to sign language, from text to sign language, from text to text in another language, from American sign language to Spanish sign language, French sign language, etc., from sign language to text (e.g., based on captured video of a person signing), from sign language to audio, and substantially any other relevant translation. Additionally, the translated information may be presented to a user through a portable device, such as a smart phone, tablet, laptop, navigation system, device specifically designed to present the translation, and other such portable devices. The uses of such portable devices presenting the translations are innumerable. Some examples can include, but are not limited to, government buildings, courts, colleges (e.g., administration, lectures, etc.), public schools, museums, business settings, web content, sporting events, transportation terminal, navigation, and other such situations.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions.

As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof.

As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method of providing a translation of information to a translated format, the method comprising:
   receiving information in a first format;
   identifying the first format, where in the first format is one of a plurality of different formats configured to be received;
   processing the information in accordance with the first format and extracting one or more speech elements from the information;
   identifying, through at least one processor configured to translate the received information, one or more sign language (SL) identifiers corresponding the one or more extracted speech elements, wherein at least one of the one or more sign language identifiers directly corresponds to a synonym of at least one of the one or more speech elements; and
   causing one or more sign language video clips corresponding to at least one of the one or more sign language identifiers to be reproduced on a display of a displaying device,
   wherein at least one of the one or more sign language video clips comprises continuity promoting images including a figure with hands in a neutral position in opening and closing frames of the at least one of the one or more sign language video clips.

2. The method of claim 1, wherein the receiving information in the first format comprises receiving the information from over a distributed network from the displaying device, wherein the information is captured directly by the displaying device.

3. The method of claim 2, further comprising:
retrieving, from a video library, one or more sign language video clips corresponding to each of the one or more sign language identifiers; and
wherein the causing the one or more sign language video clips corresponding to the at least one of the one or more sign language identifiers to be reproduced comprises causing the one or more sign language video clips to be streamed over the distributed network to the displaying device.

4. The method of claim 1, wherein the causing the one or more sign language clips to be reproduced comprises communicating the one or more sign language video identifiers over a distributed network to the displaying device, wherein the displaying device is configured to retrieve one or more prerecorded sign language video clips corresponding to each of the one or more sign language identifiers.

5. The method of claim 1, further comprising:
retrieving one or more avatar codes corresponding to each of the one or more sign language identifiers;
wherein the causing the one or more sign language video clips corresponding to the at least one of the one or more sign language identifiers to be reproduced comprises communicating, over a distributed network to the displaying device, the avatar codes corresponding to each of the one or more sign language identifiers such that the display device implements the avatar codes in rendering an avatar on the display acting out the one or more sign language video clips.

6. The method of claim 5, further comprising:
obtaining a transition avatar code, wherein the transition avatar code defines movement of the avatar between an end position of a first sign language clip of the one or more sign language video clips and a start position of a following second sign language clip of the one or more sign language video clips.

7. The method of claim 1, further comprising:
communicating, from the displaying device, the one or more sign language identifiers to a remote source; and
receiving, from the remote source, one or more prerecorded sign language video clips corresponding to each of the one or more sign language identifiers;
wherein the causing the one or more sign language video clips to be reproduced comprises sequentially playing back, on the displaying device, the one or more prerecorded sign language video clips.

8. The method of claim 1, further comprising:
receiving a selection of a first speech element;
receiving a designation of one or more signs that is to directly correspond to the first speech element;
defining a custom translation element to directly correspond to the first speech element comprising associating one or more sign language identifiers of the designated one or more signs that are to directly correspond to the first speech element, wherein the custom translation element is to be used as a translation in subsequent translations of the first speech element.

9. A system for use in translating information, the system comprising:
a non-transitory processor readable memory;
one or more processors disposed in communication with the processor readable memory, wherein the one or more processors are configured to implement a plurality of processing instructions stored in the processor readable memory, wherein the instructions when implemented cause the one or more processors to:
receive information in a first format;
identify the first format, where in the first format is one of a plurality of different formats configured to be received;
process the information in accordance with the first format and extract one or more speech elements from the information;
identify one or more sign language (SL) identifiers corresponding the one or more extracted speech elements, wherein at least one of the one or more sign language identifiers directly corresponds to a synonym of at least one of the one or more speech elements; and
cause one or more sign language video clips corresponding to at least one of the one or more sign language identifiers to be reproduced on a display of a displaying device
wherein at least one of the one or more sign language video clips comprises continuity promoting images including a figure with hands in a neutral position in opening and closing frames of the at least one of the one or more sign language video clips.

10. The system of claim 9, wherein the one or more processors are configured to receive the information from over a distributed network from the displaying device, wherein the information is captured directly by the displaying device.

11. The system of claim 10, wherein the one or more processors, when implementing the plurality of processing instructions, are further configured to:
retrieve, from a video library, one or more sign language video clips corresponding to each of the one or more sign language identifiers; and
when causing the one or more sign language video clips corresponding to the at least one of the one or more sign language identifiers to be reproduced cause the one or more sign language video clips to be streamed over the distributed network to the displaying device.

12. The system of claim 9, wherein the one or more processors when causing the one or more sign language video clips to be reproduced are further configured to communicate the one or more sign language identifiers over a distributed network to the displaying device, wherein the displaying device is configured to retrieve one or more prerecorded sign language video clips corresponding to each of the one or more sign language identifiers.

13. The system of claim 9, wherein the one or more processors, when implementing the plurality of processing instructions, are further configured to:
retrieve one or more avatar codes corresponding to each of the one or more sign language identifiers; and
when causing the one or more sign language video clips corresponding to the at least one of the one or more sign language identifiers to be reproduced the one or more processors are configured to communicate, over a distributed network to the displaying device, the avatar codes corresponding to each of the one or more sign language identifiers such that the display device implements the avatar codes in rendering an avatar on the display acting out the one or more sign language video clips.

14. The system of claim 13, wherein the one or more processors, when implementing the plurality of processing instructions, are further configured to:
obtain a transition avatar code, wherein the transition avatar code defines movement of the avatar between an end position of a first sign language clip of the one or more sign language video clips and a start position of a following second sign language clip of the one or more sign language video clips.

15. The system of claim 9, wherein the one or more processors, when implementing the plurality of processing instructions, are further configured to:
- communicate, from the displaying device, the one or more sign language identifiers to a remote source;
- receive, from the remote source, one or more prerecorded sign language video clips corresponding to each of the one or more sign language identifiers; and
- when causing the one or more sign language video clips to be reproduced the one or more processors are further configured to sequentially playing back, on the displaying device, the one or more prerecorded sign language video clips.

16. The system of claim 9, wherein the one or more processors, when implementing the plurality of processing instructions, are further configured to:
- receive a selection of a first speech element;
- receive a designation of one or more signs that is to directly correspond to the first speech element;
- define a custom translation element to directly correspond to the first speech element comprising associating one or more sign language identifiers of the designated one or more signs that are to directly correspond to the first speech element, wherein the custom translation element is to be used as a translation in subsequent translations of the first speech element.

\* \* \* \* \*